F. H. KNAPP & H. G. DEWEY.
CAN WRAPPING MACHINE.
APPLICATION FILED FEB. 13, 1915.

1,282,699.

Patented Oct. 22, 1918.
13 SHEETS—SHEET 1.

Witnesses
Jas Ed Hutchinson
Wm O Hutchinson

Inventors:
F. H. Knapp and H. G. Dewey
Bacon Milans Attorneys

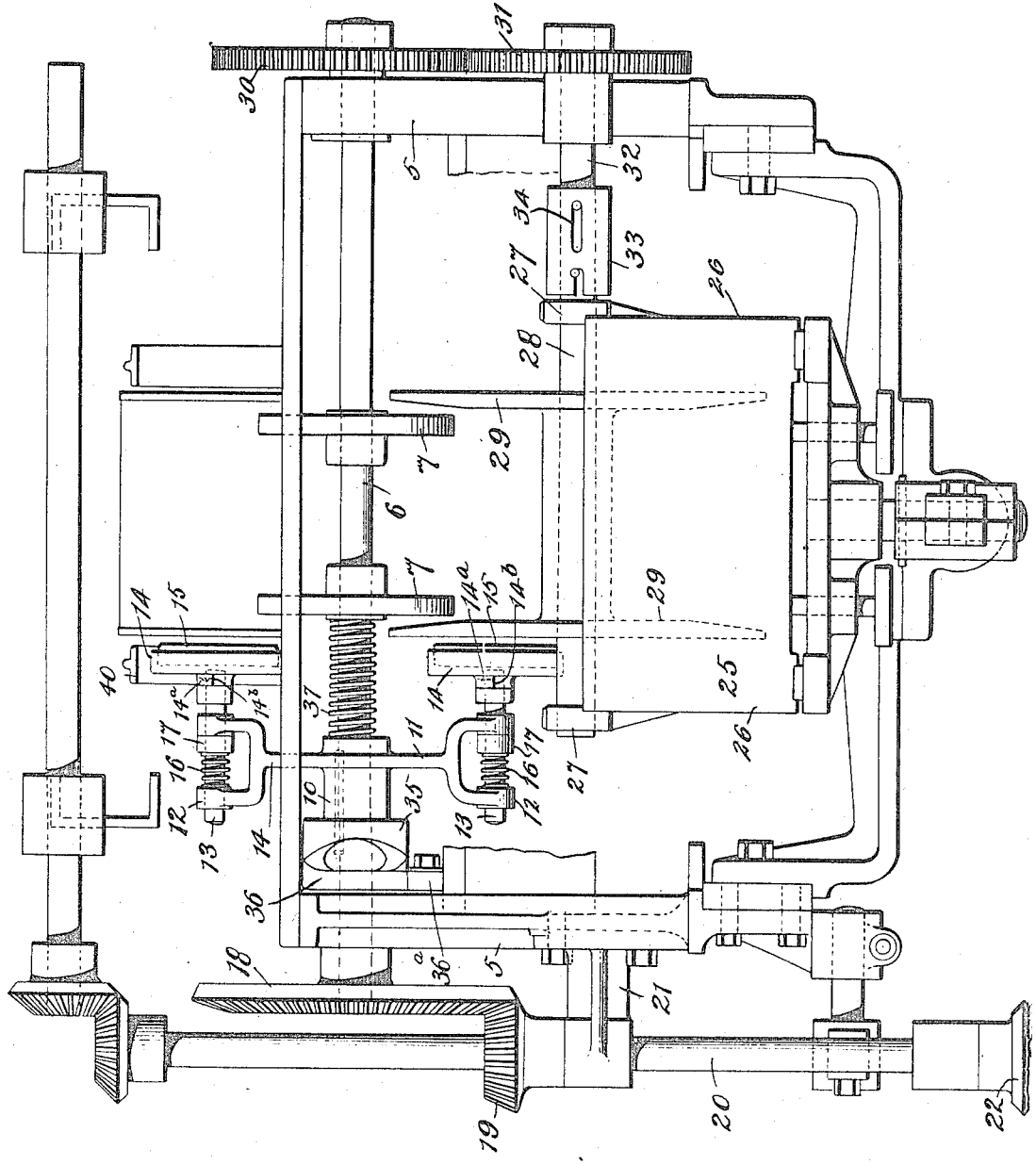

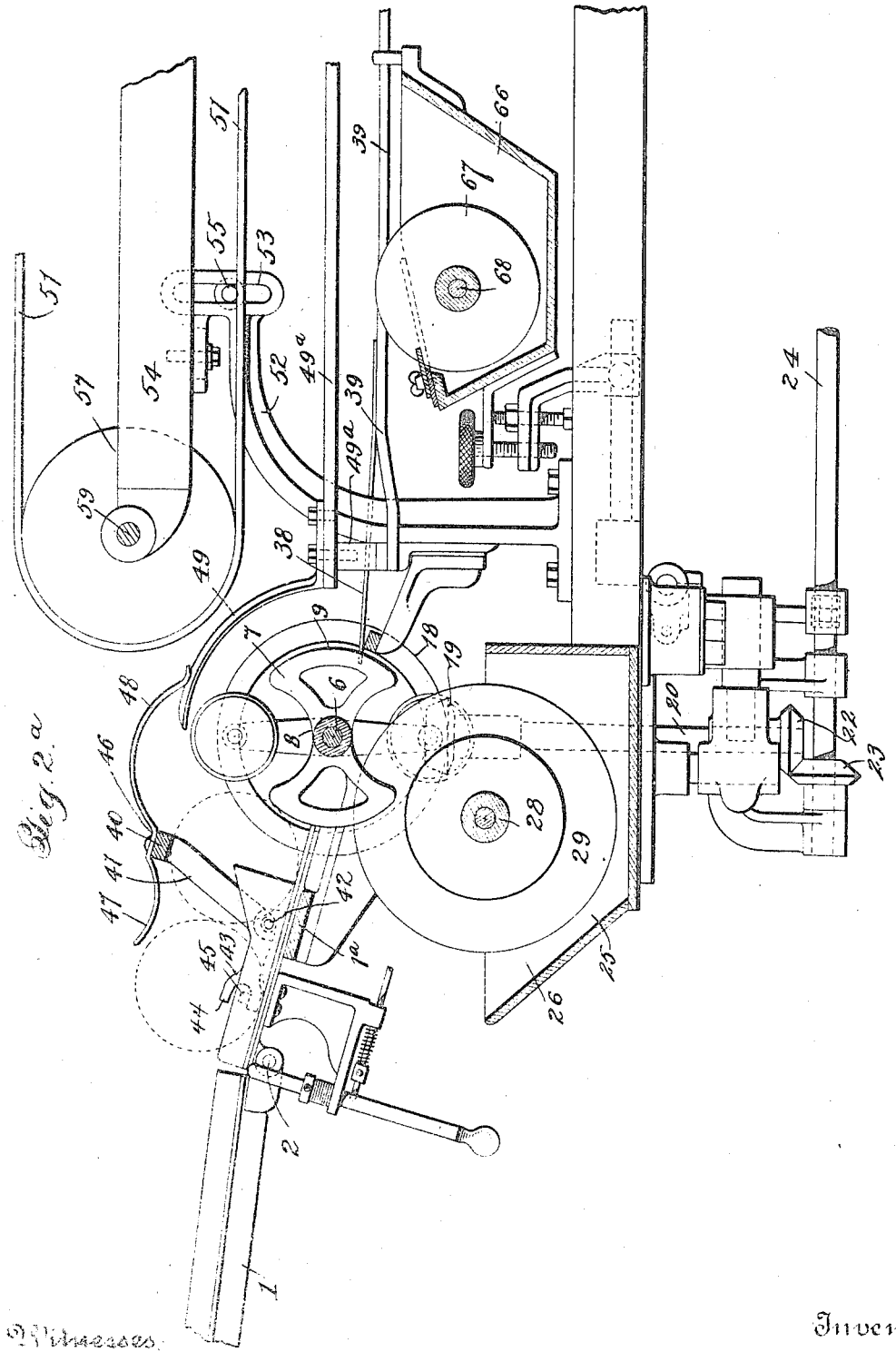

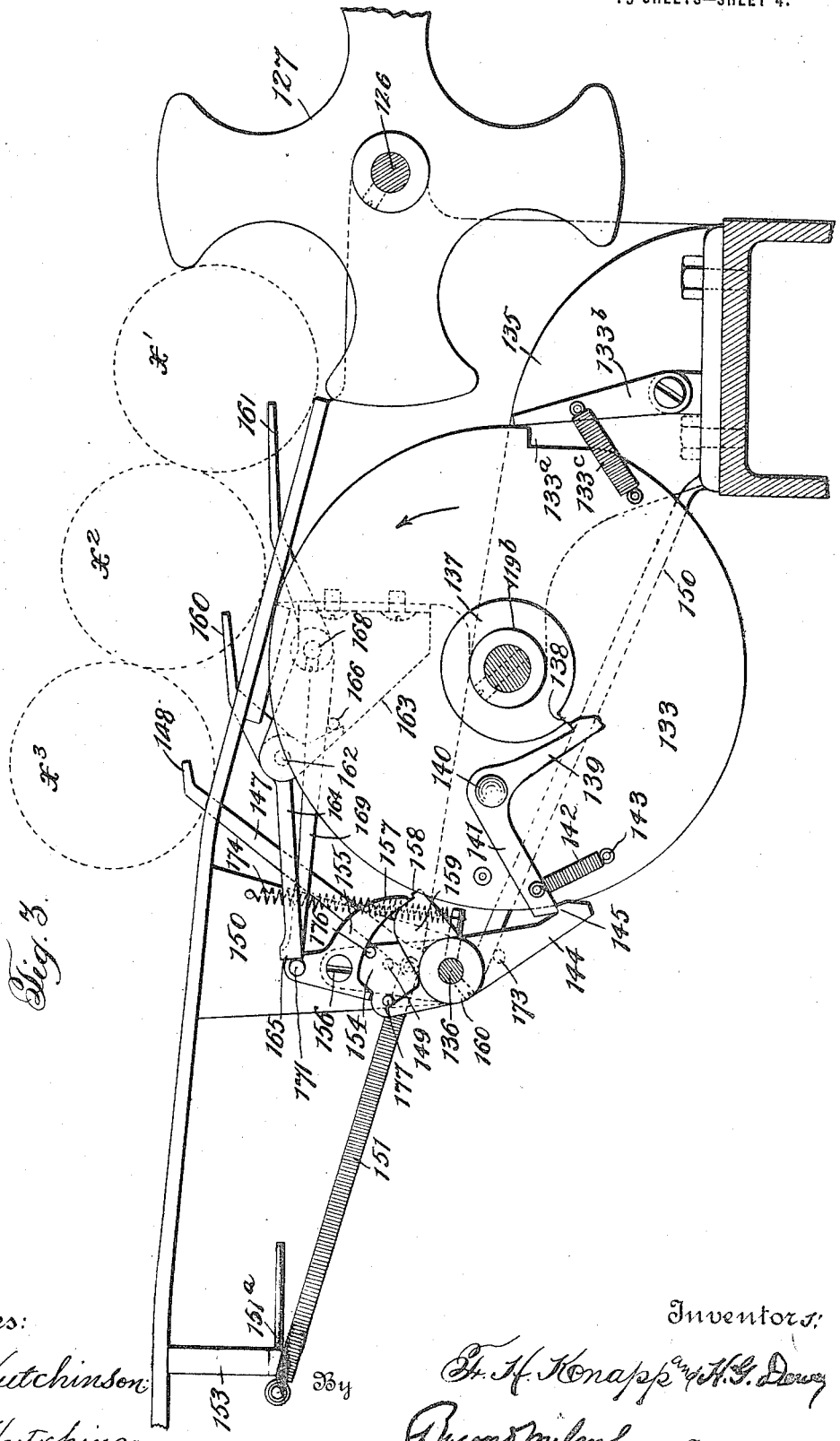

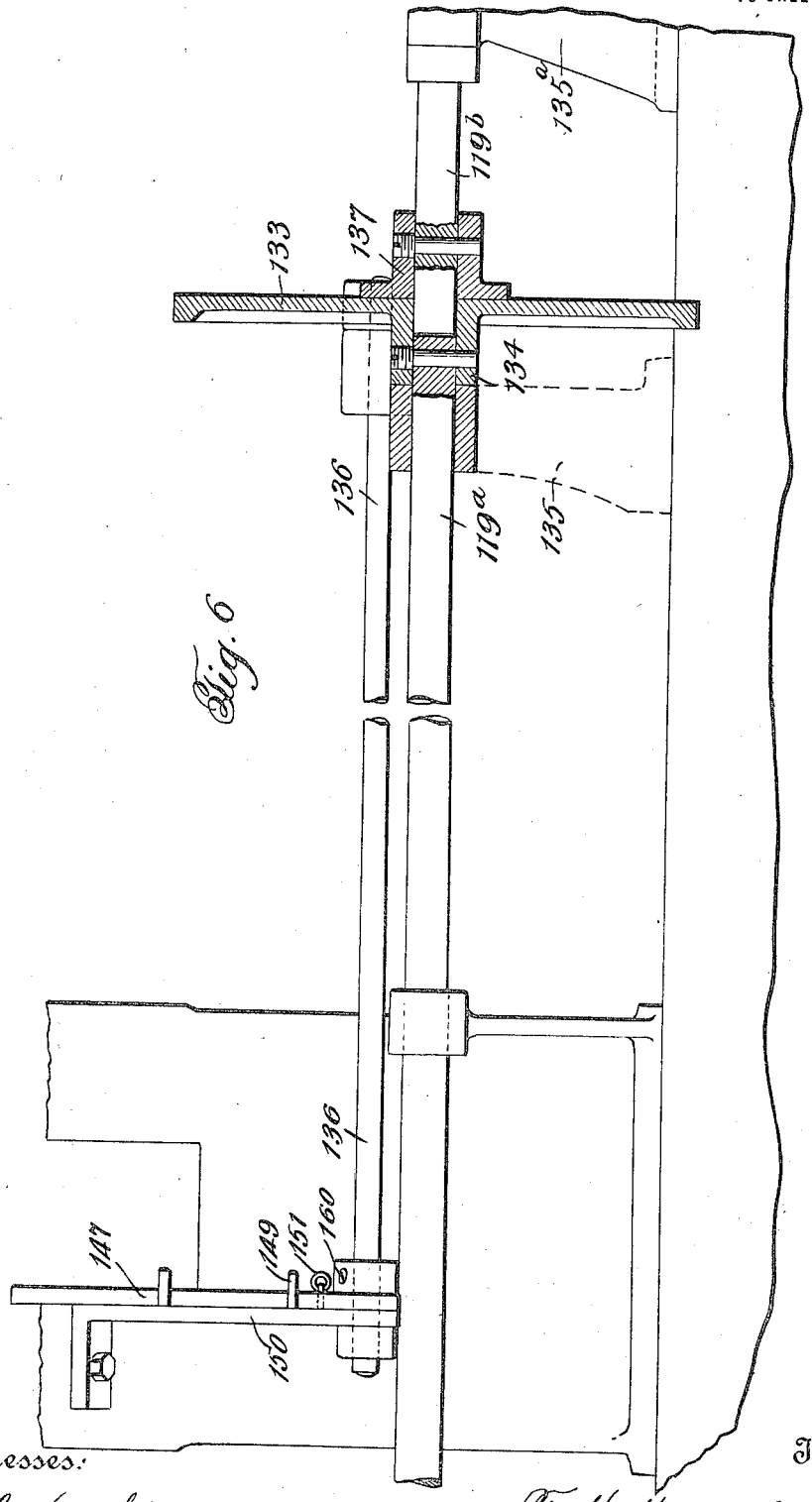

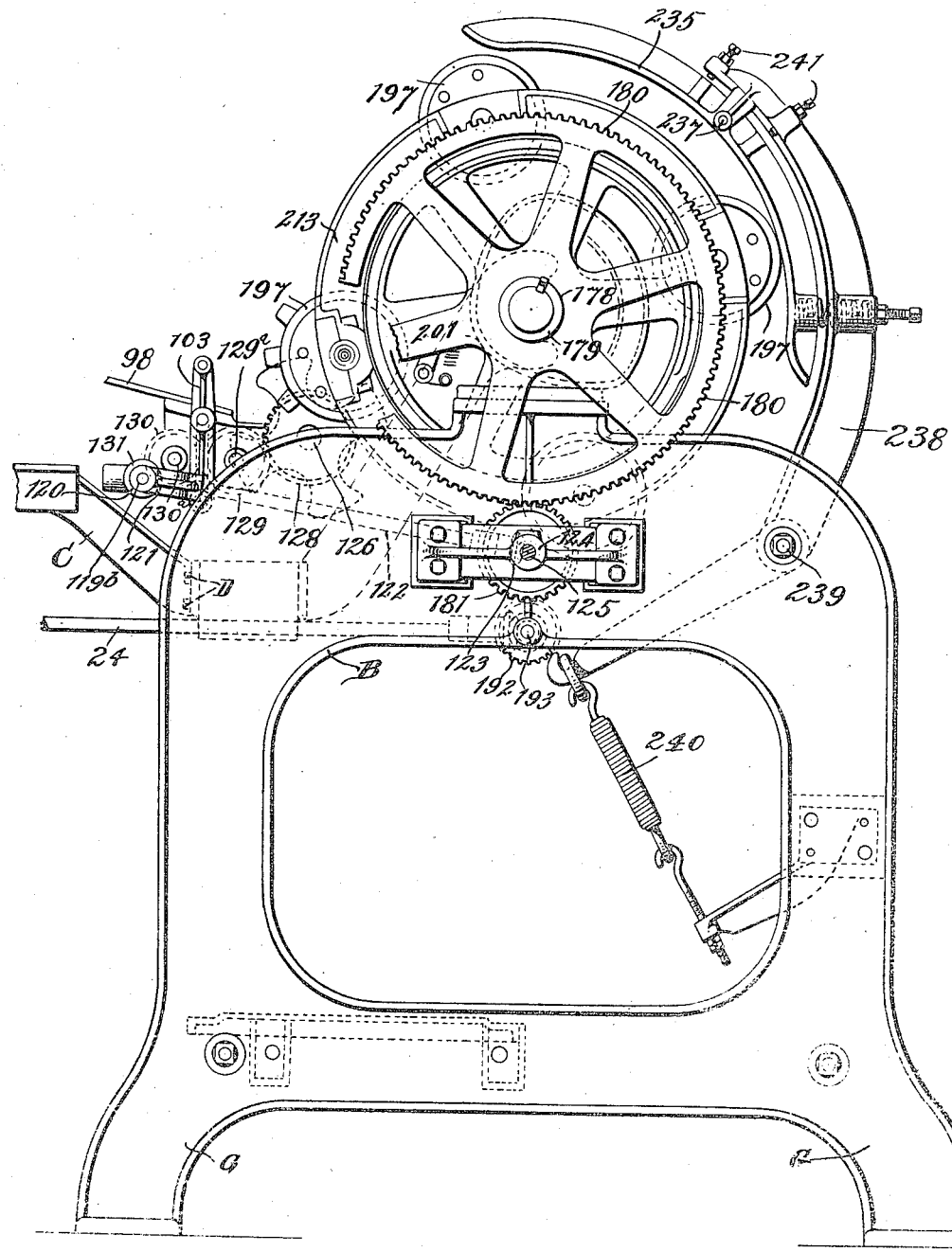

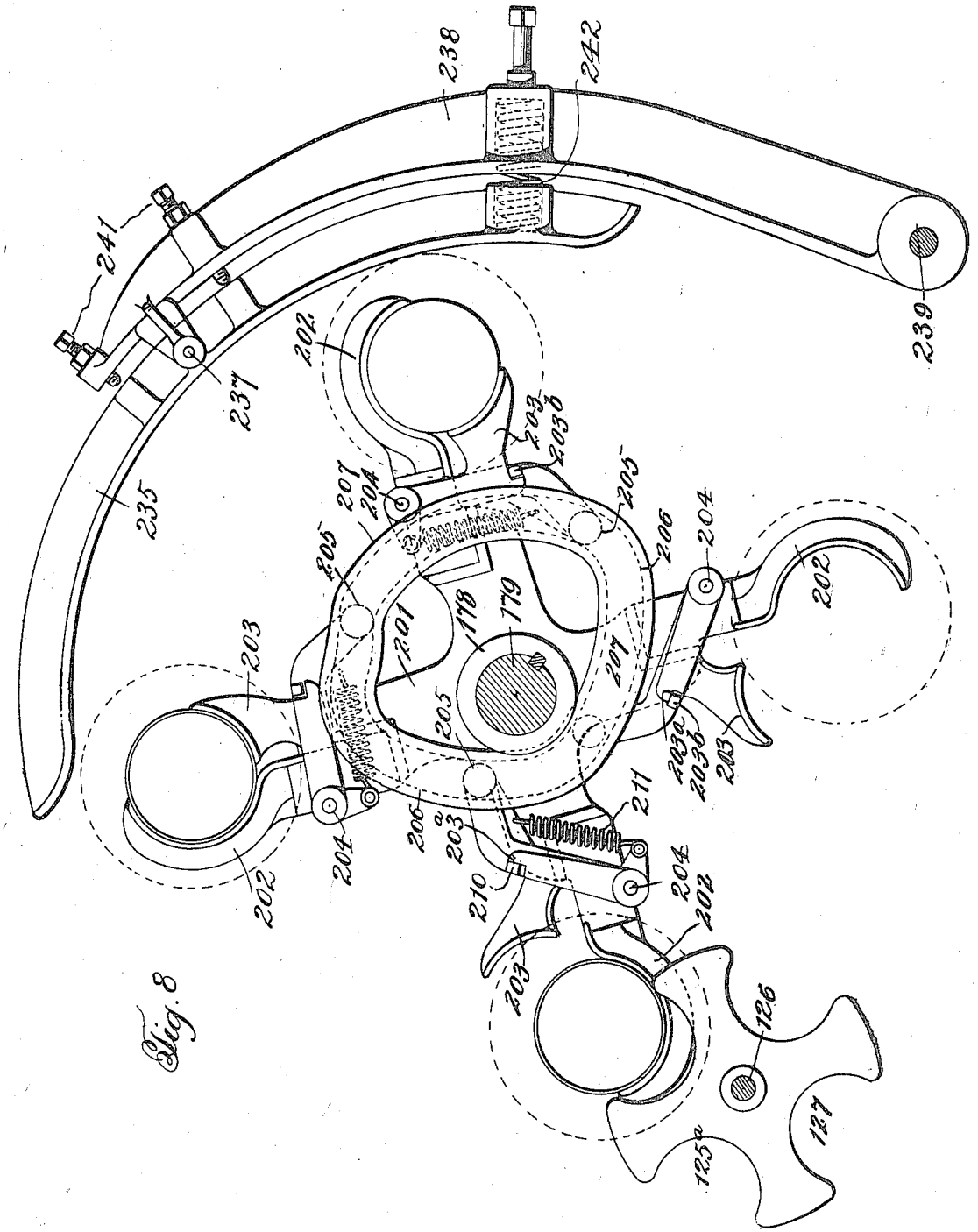

F. H. KNAPP & H. G. DEWEY.
CAN WRAPPING MACHINE.
APPLICATION FILED FEB. 13, 1915.
1,282,699.
Patented Oct. 22, 1918.
13 SHEETS—SHEET 9.
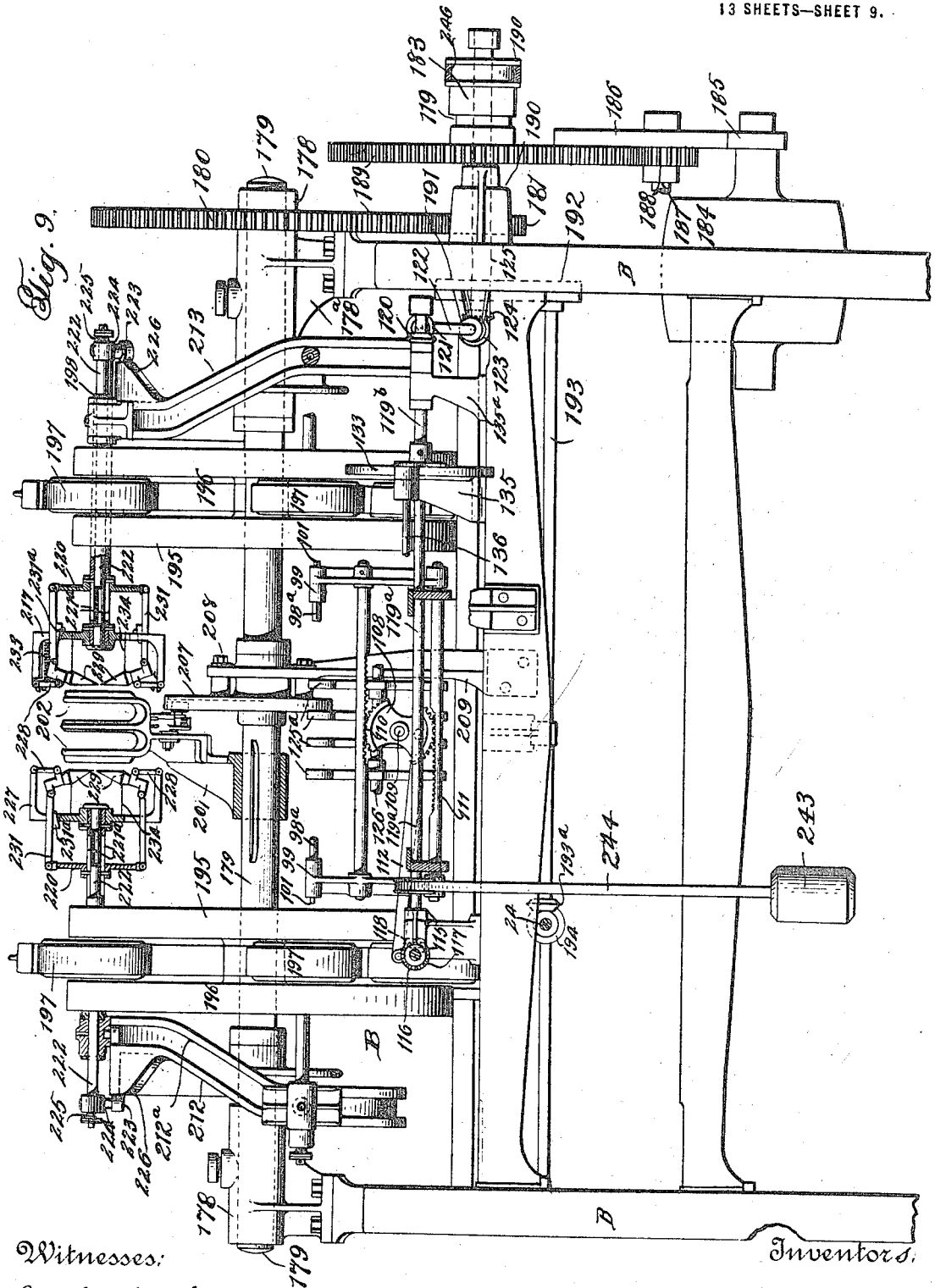
Witnesses:
Jas. E. Hutchinson
Wm. P. Hutchinson
Inventors:
By F. H. Knapp and H. G. Dewey
Brand Milans
Attorneys

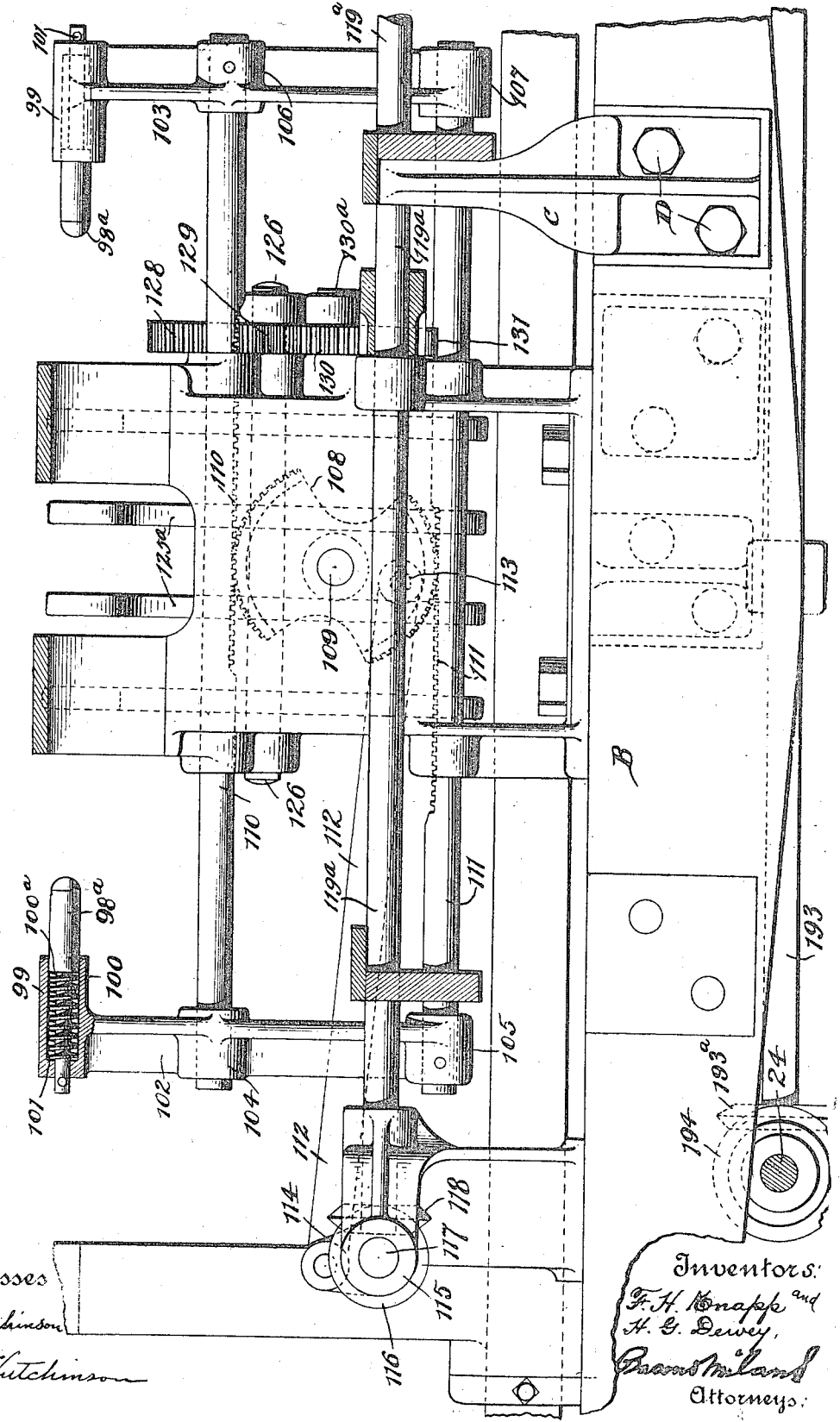

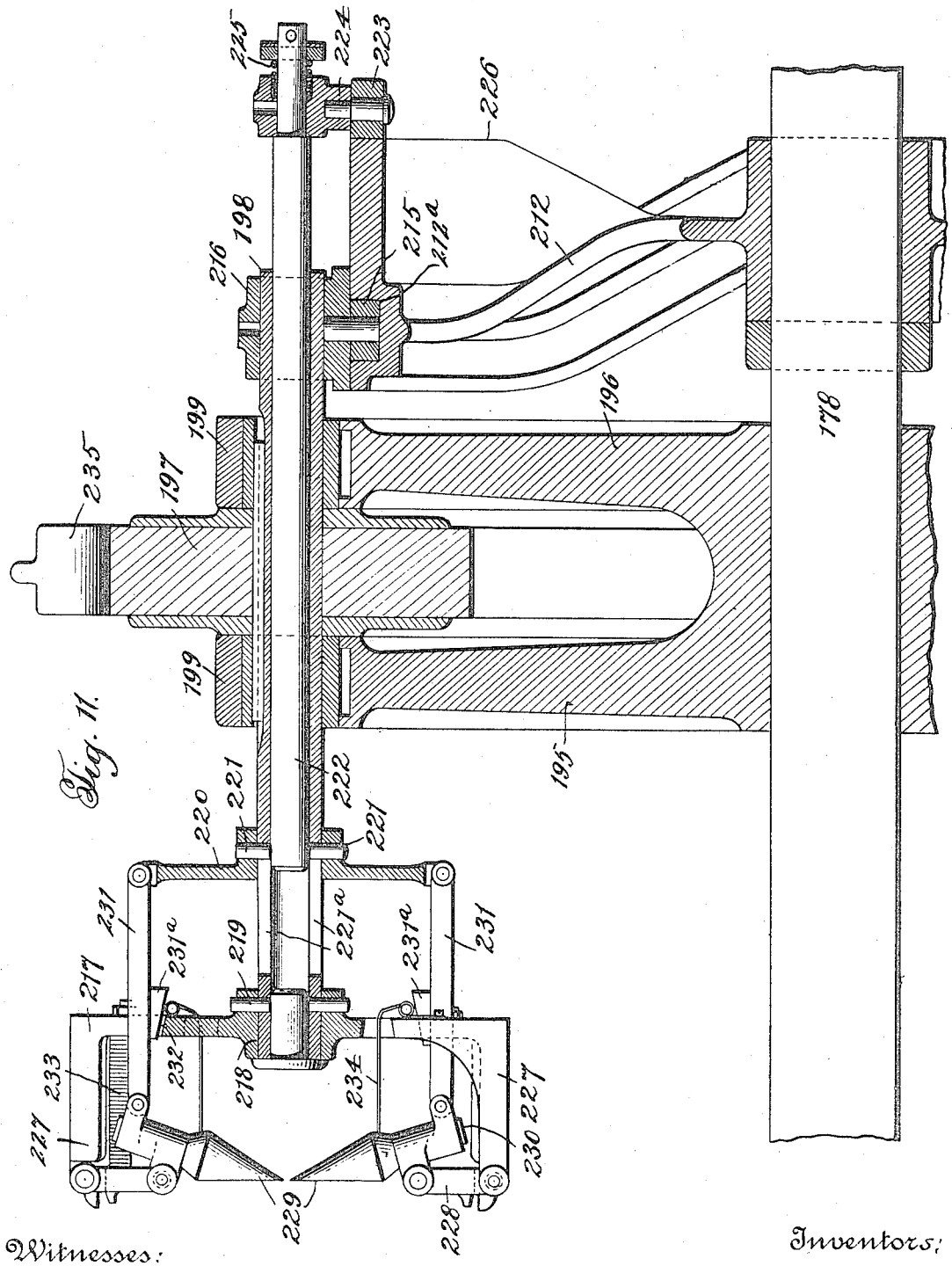

F. H. KNAPP & H. G. DEWEY.
CAN WRAPPING MACHINE.
APPLICATION FILED FEB. 13, 1915.
1,282,699.
Patented Oct. 22, 1918.
13 SHEETS—SHEET 12.
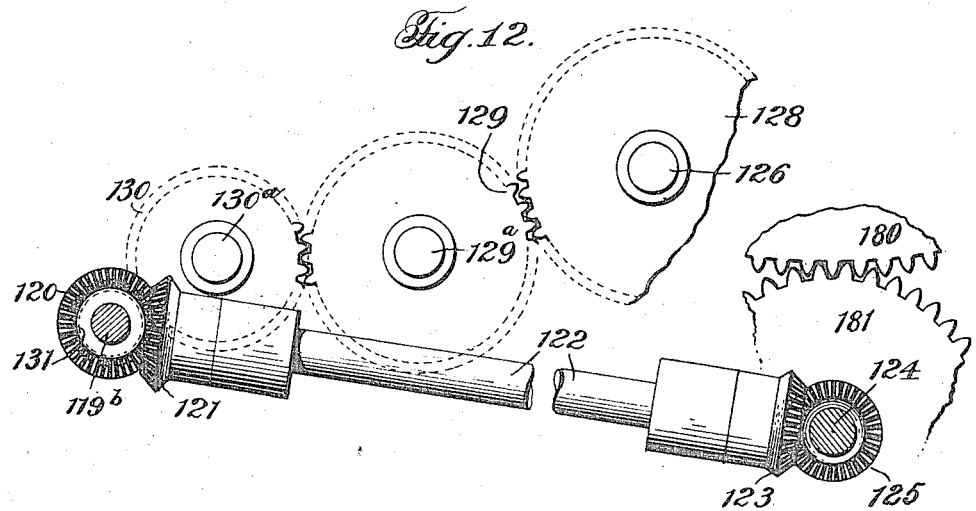
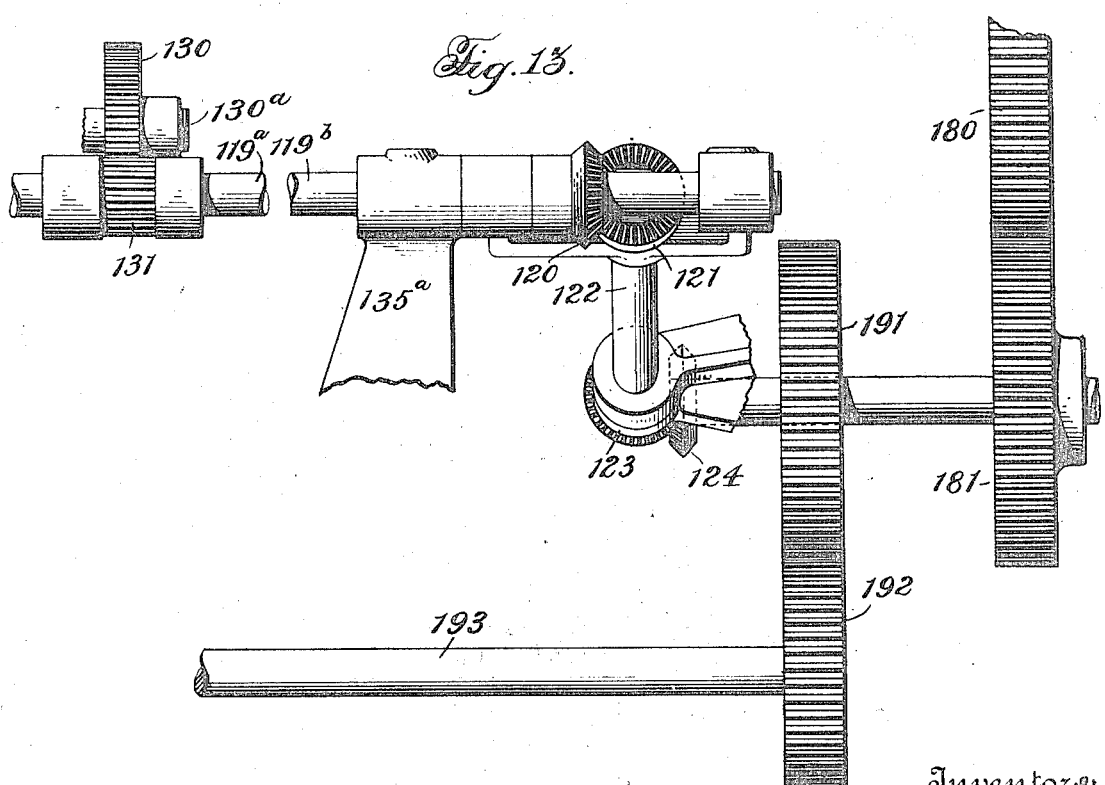

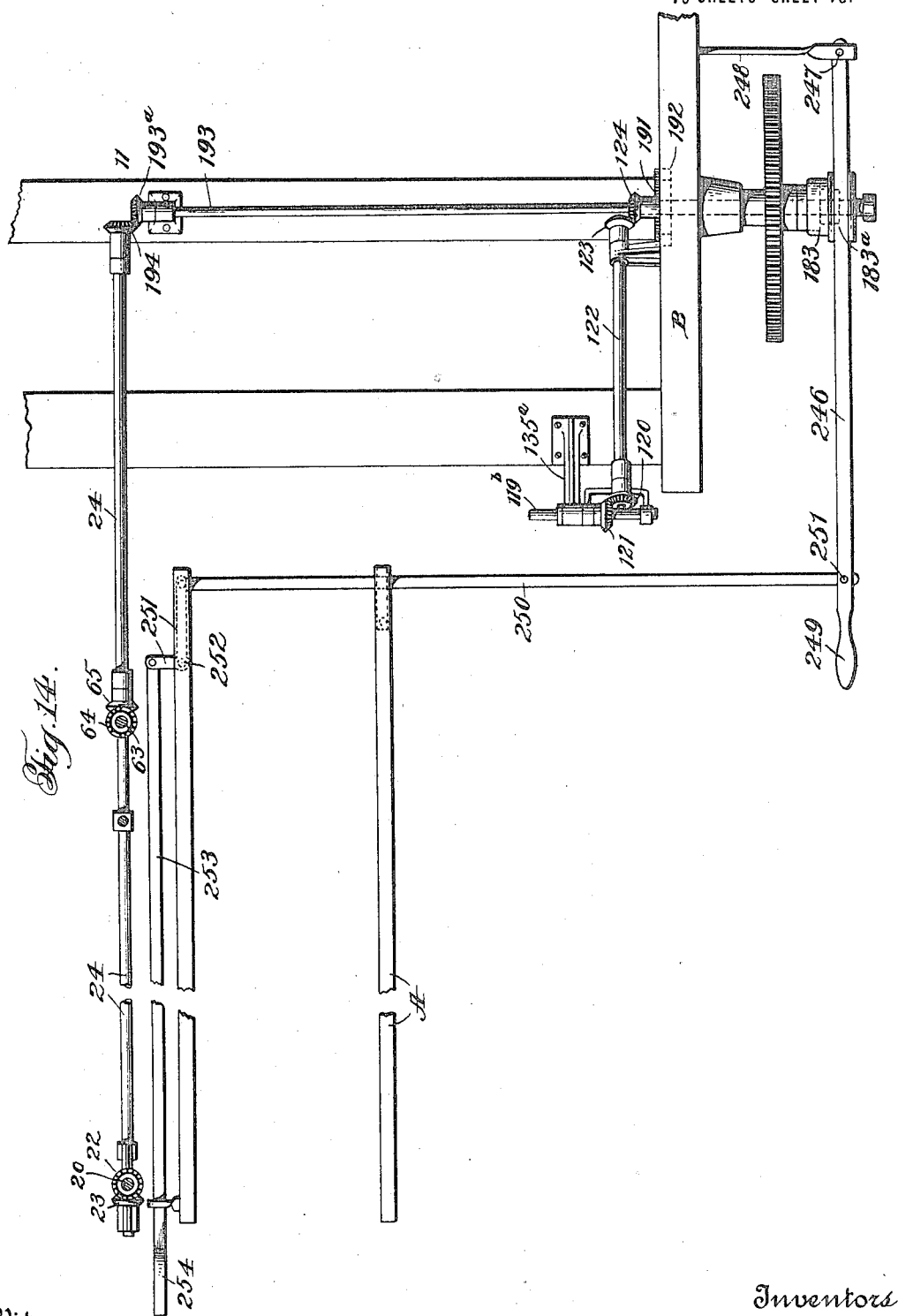

UNITED STATES PATENT OFFICE.

FREDERICK H. KNAPP, OF ROLAND PARK, AND HAYWOOD G. DEWEY, OF WESTMINSTER, MARYLAND, ASSIGNORS TO THE FRED. H. KNAPP COMPANY, OF BALTIMORE, MARYLAND, A CORPORATION OF MARYLAND.

CAN-WRAPPING MACHINE.

1,282,699.   Specification of Letters Patent.   Patented Oct. 22, 1918.

Application filed February 13, 1915.   Serial No. 8,078.

*To all whom it may concern:*

Be it known that we, FREDERICK H. KNAPP and HAYWOOD G. DEWEY, citizens of the United States, residing at Roland Park, county of Baltimore, and State of Maryland, and Westminster, county of Carroll, and State of Maryland, respectively, have invented certain new and useful Improvements in Can-Wrapping Machines, of which the following, taken in connection with the accompanying sheets of drawings, is a full, clear, and concise description thereof.

This invention relates to machines for wrapping cans, cartons, and similar packages, and more particularly to that type of machine wherein a label is applied to the periphery of the can, and wherein projecting portions of said label are folded over the ends or heads of the cans whereby the latter will be completely wrapped.

One of the primary objects of the invention is to provide, in operative association with a single label applying mechanism, a plurality of folding mechanisms adapted to operate successively on the labeled cans as delivered from the labeling mechanism, thereby greatly increasing the capacity of the machine, which results in a saving of time in the can wrapping operation and otherwise tending to improve the efficiency of machines of this character.

It is also contemplated by the present invention to provide novel and improved spacing mechanism for the cans at or adjacent the inlet end of the machine and operatively-associated mechanism for applying paste to the ends of the can.

The invention further includes novel means for maintaining the cans in proper position relative to the spacing mechanism during the movement of the latter.

Again, the invention embraces novel and approved means for applying the label or wrapper to the cans and protecting the applied label from interference or contact with the movable curling bar, lap end paste mechanism, etc., mounted upon the labeling receptacle.

It is desirable that the cans, after having the wrappers applied thereto, with the edges of the labels projecting therebeyond, be properly centered with respect to suitable folding mechanism and without damaging the projecting edges of the labels, and to this end we provide novel and improved centering mechanism.

It is also contemplated by the present invention to provide novel and improved mechanism for properly spacing the cans with the labels applied thereto and previous to the delivery of the same to the folding mechanism for the projecting edges of the wrappers.

It is also contemplated by the invention to provide means for properly timing or controlling the can-spacing mechanism adjacent the folding mechanism, to the end that the delivery of the cans to the folding mechanism will be regularly and properly timed throughout.

Still further, the invention includes novel and improved means for feeding the labeled cans from the spacing mechanism to the folding mechanism.

Still further, the invention embraces a novel construction of folding mechanism *per se*, adapted to fold projecting edges of the label over the ends or heads of the can, whereby to completely and neatly wrap the can.

Many other minor improvements and novel details in the construction and arrangement of the various parts will be appreciated from the description to follow, which, for a clear understanding of the invention is to be considered in connection with the accompanying drawings, which form a part hereof and wherein is disclosed for the purpose of illustration a convenient and satisfactory embodiment of the invention.

In the drawings:

Fig. 2 is an enlarged front elevation of this portion of the machine, certain parts being removed.

Fig. 2$^a$ is a longitudinal section of the same with certain parts in elevation.

Fig. 3 is an enlarged detail view of timing and controlling mechanism for the can spacing or escapement mechanism arranged in advance of the label folding mechanism.

Figure 1:
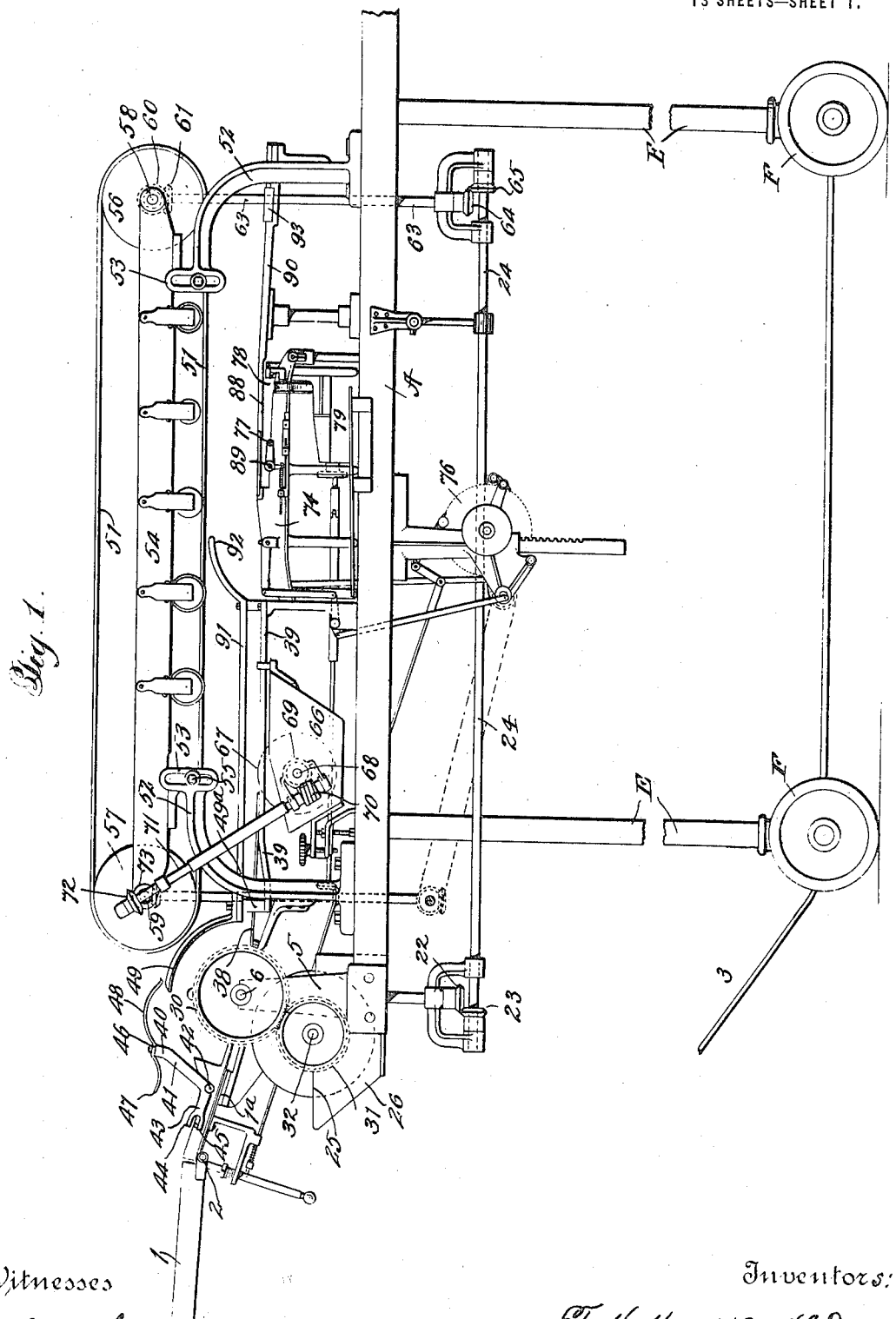
Figure 1 is a side elevation of that portion of the mechanism adapted to apply labels to the periphery of the cans.
Figure 4:
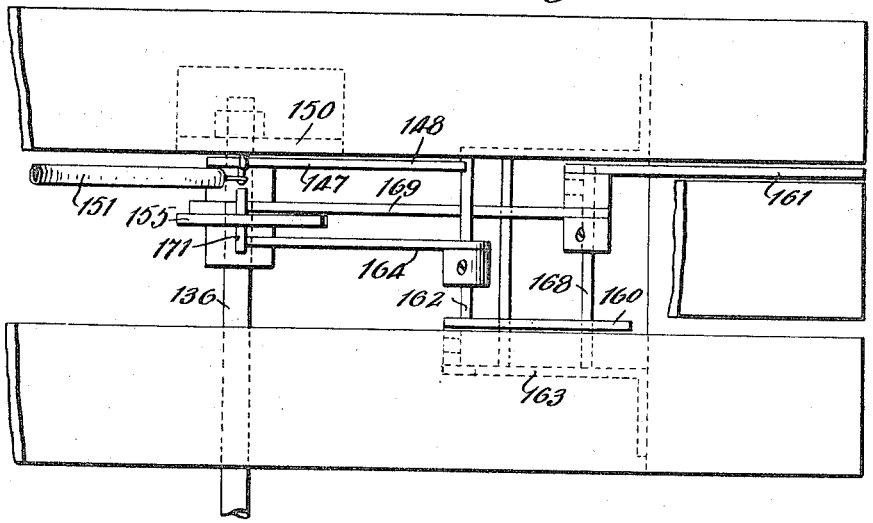
Figure 5:
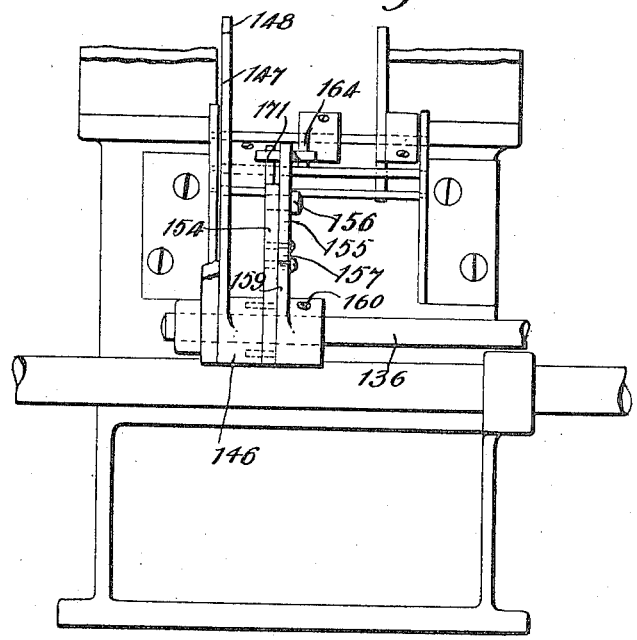

Figs. 4, 5, and 6 are details of such mechanism.

Fig. 7 is an end elevation of the label or wrapper folding mechanism.

Fig. 8 is an enlarged detail of the can gripper and carrier mechanism.

Fig. 9 is a front elevation of the mechanism illustrated in Fig. 7, certain parts being in section.

Fig. 10 is an enlarged front elevation of can centering devices, parts being illustrated in section.

Fig. 11 is an enlarged detail view illustrating the label folding mechanism and asociated operating mechanism.

Figs. 12 and 13 are enlarged detail views of a train of gearing for operating various parts of the machine.

Fig. 14 is a top plan view enlarged, illustrating more particularly the clutch and operating mechanism therefor.

With more particular reference to the drawings, it is to be borne in mind that like reference numerals or characters refer to corresponding parts throughout the several views.

The framework of the machine in the illustrative embodiment of the invention is preferably in two connected sections, the one section A being adapted to support the label or wrapper applying mechanism proper, and the other section, B, being adapted to support the folding mechanism, and the said sections being detachably coupled together as by brackets C on the one section, secured as by removal bolts D to the other section. The section A of the framework is provided with standards E mounted upon anti-friction rollers F, whereas the section B is conveniently provided with feet G, whereby when the sections of the framework are connected, the same will be rigidly supported in place, but in this connection it may be observed that the feet G of the frame section B may likewise be provided with supporting rollers.

The frame sections being formed and connected as specified, it will be appreciated that by simply loosening the bolts D and disengaging the operating driving connection between these parts in a manner to be hereinafter described, the two sections may be uncoupled, which is found to be of considerable advantage for purposes of shipment, storage, or in case it is desired to utilize the labeling characteristics of the machine independently of the folding mechanism.

At the forward end of the framework A there is provided a delivery chute 1 for cans, packages or other articles to be labeled or wrapped, the chute being hingedly connected as at 2 whereby to swing downwardly when not in use, and when in elevated position, the said chute is held in place in any desired manner as by a bracket 3, broken away in the drawing.

The spacing mechanism and can end pasting mechanism are preferably operatively associated, one with the other, whereby to render these parts positive, accurate and efficient in operation, simplify the construction and render the machine more compact. These mechanisms, in the preferred form, are constructed substantially as follows:—

A suitable support 5 projects upwardly from the frame A, the said support having bearings for a rotatable shaft 6 extending transversely of the machine and adapted to support a pair of oppositely disposed spacing heads 7, conveniently in the form of disks, each of which is provided with oppositely disposed seats or pockets 8, there preferably being two pockets for each disk and said pockets being adapted to receive the cans as fed thereinto from the chute 1. The shaft 6 is so positioned in the housing that the peripheral portion 9 of the disks 7 will, in the rotation thereof, project above the base of the chute 1$^a$, connecting with the pivoted chute 1, whereby to constitute an abutment for the cans and interrupt the movement thereof until one of the segmental pockets 8 is in position whereby to receive a can. The disks 7 are keyed to the shaft 6 for rotation therewith, and the pockets are conveniently so shaped with respect to the shape of the periphery of the cans that the latter will readily fall thereinto and when in position in said pockets will be slightly spaced from the base thereof with a view to permitting the cans to readily ride out of the pockets, in the continued rotary movement of the disks.

Keyed upon the shaft 6 for rotation therewith and for lateral slidable movement are a pair of sleeves or hubs 10, one at each side of the disks 7, and the said hubs have connected thereto oppositely disposed arms 11, adapted to overlie the space of the disks 7 formed by the pockets 8. The terminals of the arms 11 are forked as illustrated at 12, the arms of said forked portions being apertured for the loose reception of a stub shaft 13, the said shaft having supported thereon a paste applying disk 14, having a yieldable paste applying surface of any convenient material such as rubber, felt or other fabric 15. The shaft 13 which supports the paste applying disks is preferably lengthwise movable as well as rotatable, a suitable spiral spring 16 being supported on the shaft and adapted to engage at one end the inner surface of one of the arms of the forked extension 12, and at its opposite end an abutment 17, secured to the shaft. The action of the spring 16 is to force the collar or abutment 17 against the inner surface of the adjacent forked extension 12, while at the same time permitting the shaft 13, together with the paste applying disk 14, to slightly yield when in engagement with the can heads or ends, as occasion requires.

The shaft 6 together with the spacing disks 7 and the supporting arms 11 for the paste applying members 14 preferably receive rotation through the medium of a bevel gear 18, adjacent one end of the shaft 6, and fixed thereto, and adapted to mesh with a bevel pinion 19 fixed upon a vertically disposed rotatable shaft 20, supported from brackets 21, and having at its lower end a bevel gear 22 adapted to mesh with a similar gear 23 fixed upon a horizontally disposed rotatable shaft 24, which latter is adapted to be driven in a manner to be hereinafter described.

The pasting surfaces 15 of the paste applying members 14 are adapted to have applied thereto a supply of paste, and to this end a suitable paste pot or receptacle 25 of any desired construction is provided, the side walls thereof 26 having recessed brackets 27 adapted for the loose reception of a rotatable shaft 28. Positioned on the shaft 28, for rotation therewith, are paste pick-up disks 29, said disks being of a size to project above the paste receptacle 25 and overlie the entire surface of the paste applying members in the lowered position of the latter, whereby said paste applying disks will receive an application of paste from the surface of the paste pick-up disks 29 in the movement of these parts.

The shaft 28 for the paste pick up disks preferably has rotatable movement imparted thereto through the medium of a gear wheel 30, secured adjacent one end of the shaft 6 and adapted to engage a gear wheel 31, fixed upon a stub shaft 32, having a detachable sleeved engagement 33 with the shaft 28. In this connection, it will be observed that by reason of the pin and L-shaped slot connection 34, said shafts 28 and 32 are adapted to be separated one from the other, with the result that the shaft 28, together with the paste pick-up disks may be elevated upwardly and bodily removed from the paste receptacle for the purpose of cleansing, etc.

Means for positively moving the paste applying members 14 into and out of engagement with the can ends and paste pick-up members 29 preferably includes cam members 35, fixed one upon each of the hubs 10 of the paste carrying arms 11. Said cams in the rotary movement of the arms 11 are adapted to engage fixed cam surfaces 36, whereby the hubs 10 and connected arms 11 will be forced inwardly, suitable spiral springs 37 being positioned between the hubs 10 and the outer surface of the spacing disks 7 and sleeved upon the shaft 6, whereby to normally retain the cam surfaces 35 and 36 in engagement, and whereby, at the proper time, to separate the pasting surfaces 15 of the paste applying members 14 from the ends of the can and from the surfaces of the paste pick-up disks 29. The fixed cam members 36 are adjustably mounted as by a bolt and slot connection 36$^a$ upon the inner faces of the housing 5. While but one of the arms 11 and associated parts are illustrated in Fig. 2, it will be appreciated that in actual practice these parts are duplicated on the machine at opposite sides, whereby to simultaneously apply paste to opposite ends of the cans.

It will be noted that as the shaft 6 is rotated, a can will be picked up from the feed chute 1$^a$ in one of the pockets 8 of the spacing disks 7, and the cam members 35 and 36 are so relatively positioned and timed that as a can is delivered into a pocket 8, the pasting surfaces 15 of the disks 14 are separated a sufficient distance to allow the can to readily roll into place and between said pasting surfaces. In the continued movement of the shaft 6 the interengagement of the cam surfaces forces the collars 10, connected arms 11, and pasting surfaces 15 inwardly toward the ends of the can, thereby applying paste or gum to both ends of the can at the same time. Simultaneously with this operation, the pasting surfaces 15 at the opposite end of the arms 11 are forced into contact with the pasting surface of the paste pick-up disks 29, whereby to receive a fresh supply of paste to be delivered to a succeeding can. The paste applying members 15 are rotatable in contact with the center of the cans during the rotary movement of the spacing disks 7, until said disks arrive at a position to release the can onto the inclined way 38, connecting with the runway 39, when the cam surfaces permit of the arms 11 to be forced outwardly by the springs 37, thereby separating the pasting surface 15 from the can ends and from the paste pick-up disks 29. The parts are then in position to receive a succeeding can.

It has been seen that the paste pick-up members 29 are readily releasable from the paste receptacle for cleansing, and the connection between the pase applying members 14 and the shafts 13 is likewise of construction to permit these paste applying members to be readily detached for cleansing purposes, the connection between the paste applying members 14 and shaft 13 preferably including a spring catch 14$^a$ on the hub of the member 14, being adapted to engage in an annular groove 14$^b$ in the shaft 13.

A novel construction of can guard is provided whereby to coöperate with the spacing mechanism and includes a forked bracket member, the cross bar 40 of which constitutes a can stop and the arms 41 of which being pivoted at 42 to the sides of the chute 1ª. The arms 41 have an extension 43, beyond their pivotal connection 42, with a bifurcated terminal 44, adapted to loosely overlie a pin or abutment 45, the engagement between the furcations 44 and the pin being such as to permit of a tilting movement of the stop bar 40 about the pivot 42.

Positioned upon the cross bar 40, is a suitable hood or guard 46, having a downwardly curved forward end 47, and an upwardly curved rearward portion 48. When these parts are in normal position, assuming that a can is in contact with the periphery 9 of the spacing disks, the disks coöperate with the stop 40 to prevent the entrance of a can under the portion 48 of the hood. When, however, one of the pockets 8 is in position to receive a can, the stop bar 40 is sufficiently spaced from the wall of the pocket 8 whereby to permit the can to readily pass the stop bar 40. The portion 48 of the hood or guard prevents the cans from jumping out of the pockets 8, but assuming that a can should, by any possibility, become wedged between the periphery of the disks 7, and that portion 48 of the hood, then the arms 41 of the stop member would be tilted about the pivot 42 whereby to force the rear end 47 of the stop member into engagement with succeeding cans and positively interrupt the movement thereof along the chute.

Suitable curved guides 49 project upwardly and forwardly from the supporting frame 49ª and are adapted to overlie the ends of the cans as they are delivered from the spacing mechanism onto the runway, 39.

Means for feeding the cans along the runway conveniently takes the form of a plurality of endless belts or carriers 51, extending longitudinally of the machine above the runway and adapted to impart rolling movement of the cans to the label or wrapper applying mechanism to be presently described.

52 are overhang brackets supported from the framework A and terminating at the upper ends in slotted portions 53, whereby to adjustably support the feed belt supporting frame 54, through the medium of set screws 55 passing through said slotted portions 53. Supporting rollers for the belts 51 are illustrated at 56 and 57, the same being fixedly mounted upon shafts 58 and 59, respectively, for rotation with the latter. The shaft 58 is conveniently the driving shaft, the same having rotatable movement imparted thereto through the medium of a bevel gear 60 fixed for movement with the shaft and adapted to engage a similar gear 61, fixed upon a vertically disposed rotatable shaft 63, having at its lower end a bevel gear 64, adapted to mesh with a similar gear 65 upon the horizontally extending shaft 24 heretofore referred to, and through the medium of which latter the belts are given movement for feeding the cans along the runway.

Label or wrapper pick-up pasting mechanism preferably includes a paste pot or receptacle 66, supported in any desired manner, said receptacle having supported therein for rotatable movement, a paste roll or rolls 67, the latter being mounted upon a shaft 68, having bearings in the sides of the receptacle and said shaft having an extension beyond one side of the receptacle upon which is mounted a worm gear 69, adapted to mesh with a worm 70, adjacent the lower end of a shaft 71, extending vertically at a forward inclination and having at its upper end a bevel gear 72, adapted to mesh with a similar gear 73, fixed upon the roller shaft 59. The periphery of the paste applying roller 67 projects above the runway 39, whereby as a can rolls along the runway, a daub of paste is applied thereto by the roller 67 with the result that in the continued rotation of the can the pasted area thereof will be brought into contact with the uppermost label on a label support whereby to pick up the same.

The label or wrapper applying mechanism is arranged rearwardly of the paste receptacle 66, and it is unnecessary to describe the same in detail except so far as the particular parts thereof are peculiarly characteristic to a can wrapping machine of the character under consideration. The label receptacle proper includes suitable laterally adjustable sides 74, and a bed or follower which constitutes the rest proper for a supply of labels. It is understood that this follower is adapted to have vertical movement imparted thereto from time to time through the medium of suitable ratchet mechanism 76, and associated parts.

The size of the label receptacle is such as to accommodate wrappers of a width somewhat greater than the length or height of the cans whereby the projecting portions of the wrapper in the subsequent operation of the machine may be rolled over the heads or ends of the can. In this connection, the can in its movement over the label receptacle instead of being supported upon the side walls of the receptacle, the upper edges of which ordinarily perform the function of runways, rests upon the rolls directly over the supply of labels which constitute the runway at this point. As is customary in labeling mechanisms, a suitable curling bar 77 overlies the upper surface of the topmost label whereby, as the label is removed by the can, the same has imparted thereto a curling tendency whereby to readily conform to the periphery of the can. Likewise, a pasting member 78, conveniently an endless paste belt carrier, projects across the top of the label receptacle whereby to engage the upper surface of the lap end of the label. This endless paste carrier conveniently has movement imparted thereto through the medium of a roller mounted within a paste receptacle 79.

It having been noted that the label supply forms a runway for the cans during the application of the label or wrapper to the latter, it is desirable to provide means to prevent contact of the cans, with the applied label, with either the curling bar 77 or the lap end pasting member 78, and to this end suitable auxiliary runway bars 88 are provided to overlie the lap end pasting member, and terminating adjacent the curling bar, to the end that the cans with the applied labels will ride over said runway bars 88 and will not contact with the curling bar or lap end paste mechanism.

The sides of the label receptacle have a runway extension 89 adapted, when said sides are adjusted inwardly, to overlie the runway bars 88 and form continuations thereof. When this is the case, the tops of the sides of the label receptacle also form runways, which is important in the event it is desirable to utilize one portion of the machine as a labeling device, in which the ends of the labels need not be folded over the ends of the cans.

In order to properly position the cans with respect to the wrappers, whereby to evenly divide the projecting ends of the wrappers, suitable guides 91 are provided, one adjacent each end of the can, which said guides, however, at a point adjacent the forward end of the label receptacle, are upwardly curved at 92, at which point they terminate, whereby the projecting ends of the wrapper, as applied to the can will not contact with said guides, which would tend to wrinkle or otherwise injure the same.

The can, after having had applied thereto the wrapper, continues its movement along the runway 90 and is brought into contact with a suitable seaming or ironing pad 93, whereby any wrinkles will be ironed and the wrapper assume a smooth engagement about the periphery of the can.

Means for properly centering the cans after delivery from the label receptacle will now be described.

That portion of the runway 90 rearwardly of the label receptacle and conveniently supported upon the framework B for the folding mechanism is inclined downwardly in a direction toward the rear end of the machine. Suitable spacing mechanism, to be presently described, is arranged at the lower end of the inclined runway portion 98 and constitutes an abutment for interrupting the movement of the cans. In view of the fact that no guiding mechanism for the ends of the cans is provided because of the protruding edges of the wrappers, the cans, with the applied wrappers, are very apt to run slightly out of line or in a direction toward one side or the other of the runway after leaving the label receptacle. It is desired, of course, to accurately aline or register the cans with regard to the spacing and folding mechanism, and with this end in view, we provide suitable centering devices, one adjacent each end of the can and adapted to engage said ends and properly position the can previous to its entrance into the spacing mechanism.

The centering devices proper are in the form of pins $98^a$ mounted in cross arms 99 and one of which is preferably yieldably supported in position as by spiral spring 100, housed within said cross arm and engaging a shouldered portion $100^a$ of said pin, so as to normally force the same into an inward position limited by a stop pin 101, adapted to engage the outer surface of the cross arm. The cross arms 99 are mounted upon supporting arms 102, and 103 respectively, the arm 102 having intermediate its ends an apertured boss or sleeve 104 and a similar boss or sleeve 105 at the opposite end thereof, whereas the arm 103 has intermediate its ends an apertured boss 106, and at its opposite end a similar boss 107. A segment member 108 is loosely mounted upon a shaft 109 for rocking movement, the segment having oppositely disposed teeth adapted to mesh respectively with teeth upon an upper rack bar 110 and a lower rack bar 111. The upper rack bar is loosely positioned at one end in the boss 104 of the supporting arm 102, and fixed at its opposite end in the boss 106. On the other hand, the lower rack bar is fixed at one end in the boss or sleeve 105 upon the arm 102, and at its opposite end has a loose engagement with the boss or sleeve at the lower end of the supporting arm 103.

The segment rack 108 has movement imparted thereto through the medium of a connecting bar or rod 112, which latter has a loose connection at one end with a pin 113 eccentrically mounted upon said segment rack, and said connecting rod has a loose connection at its opposite end with a crank arm 114, which latter is adapted to have movement imparted thereto through the medium of a rotatable member 115 having a bevel gear 116 mounted upon a stub shaft 117, and adapted to mesh with a bevel gear 118, mounted upon one end of an elongated sectional shaft $119^a$ and $119^b$, extending transversely of the machine and having adjacent the opposite end thereof a bevel gear 120. The gear 120 is adapted to mesh with a similar gear 121, mounted on a shaft 122, which said shaft has at its opposite end a bevel gear 123, adapted to mesh with a similar gear 124, fixed for rotation with an elongated shaft 125, which latter extends transversely of the machine.

It will be appreciated from an understanding of the structure just described that the rack bars 110—111 are oppositely acting through the medium of the train of gear mechanism whereby the centering pins 98$^a$ will simultaneously move either inward into contact with the ends of the can or outward out of contact with the can. The operation of the pins 98$^a$ is so timed that as one can is delivered to the spacing mechanism, to be described, the pins move inwardly into engagement with the ends of a succeeding can, thereby centering the latter before being delivered to the spacing mechanism. The pins 98$^a$ being relatively yieldably suported, they are adapted to give, whereby to accommodate for cans of irregular size.

Means for spacing the cans with the wrappers applied, whereby to accurately deliver the same to the folding mechanism, hereinafter described, preferably includes spacing disks 125$^a$, conveniently four in number, and arranged in separated relation upon a shaft 126. The disks each have segmental cut out parts 127, four being illustrated, which form pockets for the reception of the wrapper applied cans. The disks are fixed on the shaft 126, and the latter is rotated through the medium of a gear wheel 128, fixed thereto and adapted to mesh with a gear wheel 129 on a shaft 129$^a$. The gear wheel 129 meshes with a gear wheel 130 on the shaft 130$^a$, which said gear wheel 130 in turn meshes with a gear wheel 131 on the shaft 119$^a$. Through the train of gear mechanism just described, the spacing mechanism is rotated. It is desirable that once the cans are started through they should be correctly timed, and at least two or more cans should remain properly positioned with respect to the spacing mechanism, for in the event of intermittent can supply or inattention of the operator, succeeding cans would roll to the spacing and folding mechanism at irregular or uncertain intervals. We, therefore, provide means, governed by the incoming cans, for automatically interrupting the rotatable movement of the spacing mechanism at all times, when a predetermined number of cans is not properly positioned with respect to said spacing mechanism.

The function of timing or controlling the operation of the can spacing mechanism in the preferred embodiment of the invention is accomplished substantially as follows:—

That section 119$^b$ of the shaft 119$^a$ and 119$^b$ has imparted thereto a constant rotatable movement through the medium of the gear mechanism 120, 121, 122, 123, 124, whereas the shaft section 119$^a$ is intermittently rotated through the medium of interposed clutch mechanism controlled by the movement or position of cans on the runway 98$^a$. The gear wheel 131 being mounted on the intermittently rotated shaft section 119$^a$, the operation of the spacing mechanism will, of course, be determined by the operation of said shaft section 119$^a$.

Fixed on the shaft section 119$^a$ is a clutch member 133, in the form of a disk having a hub or bore 134, projecting slightly beyond that end of the shaft section 119$^a$ which connects with the shaft section 119$^b$, and said projecting bore forming a pocket to receive said connecting end of the shaft section 119$^b$. A suitable supporting bracket 135 on a stationary part of the framework forms a bearing for the shaft section 119$^a$, said bracket 135 having a lateral extension forming a bearing for what may be termed a clutch trip shaft 136. The shaft section 119$^b$ is suitably supported in a bracket support 135$^a$ and adjacent the inner end thereof has fixed thereto an enlarged collar 137 having a peripheral cut out portion or notch 138. The collar 137 coöperates with the clutch member 133 in a manner to presently appear to clutch or release the shaft sections 119$^a$ and 119$^b$. On that face of the clutch disk 133, adjacent the notched collar 137 is a dog 139, overlying the periphery of the collar and adapted to engage the notched portion 138 thereof. The dog 139 is mounted for swinging movement upon a pin 140, on the clutch disk 133, and has an offset engaging part 141, projecting slightly beyond the periphery of the clutch disk 133. A spring member 142 secured at one end to a pin 143, on the clutch disk, and at its opposite end to the engaging end 141 of the dog tends to normally contact said dog with the notched periphery of the clutch member 137. A latch arm 144 is rigidly mounted on the latch trip shaft 136, and has an offset end 145 adapted, in the movement of the arm, to contact with that part of the dog 141 which projects beyond the periphery of the clutch disk 133.

Adjacent the opposite end of the shaft 136 and loosely sleeved thereon is a hub 146, of an upwardly projecting can trip arm 147. The upper end of the arm 147 projects above the runway in the path of the moving cans and has an inclined offset can engaging surface 148, whereby the cans readily ride over said inclined surface and depress the member 147. A pin 149 on a bracket support 150 for the latch trip shaft 136 limits the upward swinging movement of the can trip arm. A suitable spiral spring member 151 adjustably supported at 151$^a$ to a supporting arm 153, tends to normally hold the can trip arm in upper position. Rigidly attached to the hub of the can trip member 147 and also free to oscillate on the shaft 136 is an upwardly projecting rocker 154, adapted to support a pawl 155, pivoted thereto at 156, and having a downwardly and laterally curved finger 157 adapted, at its terminal, to engage a lug 158 at the outer end of an intermediate dog 159 mounted upon the latch trip shaft 136.

The intermediate dog 159 is sleeved on said shaft whereby to be accurately adjusted with respect to the associated mechanism, and when properly positioned is fixed to said shaft as by a set screw 160. The pawl 155, being pivoted at a point beyond its center of gravity, will normally maintain an operative engagement with the abutment lug 158 of the intermediate dog 159, and when in this position any forward movement of the can trip member 147 will impart rocking movement to the latch trip shaft 136, and by reason of the release or engagement between the latch 144 fixed on said shaft and the dog 141, the latter, under action of the spring 142, will move into engagement with the notched collar 137, thereby coupling the shaft sections $119^a$ and $119^b$ together, to the end that the spacing mechanism will be rotated, thus feeding a can from the position indicated at $X'$ in Fig. 3, into the path of the gripper fingers of the folding mechanism, presently to be referred to.

Assuming that no can happens to be in the position indicated at $X'$, the interval of time elapsing between the travel of a can from the can trip member 147 to the spacing disks, being necessarily uncertain, due to dented cans, slippage of feeding belts, etc. the can is apt to arrive at the position $X'$ at a time when it would not register with a pocket of the spacing disks. Then again, the cans are supposed to be centered, as previously described, and an irregular delivery of the cans at this point would result in pressing or damaging the projecting portions of the wrapper, and possibly also resulting in breakage of the machine parts.

Suitable mechanism is provided to positively prevent disengagement between the latch 144 and the dog 139 until such time as a plurality of cans are in position to be regularly taken up by the successive pockets of the spacing devices. This position of the cans is illustrated at $X'$, $X^2$ and $X^3$, in Fig. 3 of the drawings. At such times when the cans are not properly positioned to prevent disengagement of the latch arm 144 and dog arm 141 we provide suitable detaining or safety mechanism for automatically releasing operative engagement between the gravity finger 157 and lug 158, of the intermediate dog 159. This mechanism includes auxiliary can trip members 160 and 161, both of which project above the runway so as to be engaged by a passing can. The trip arm 160 is pivoted at 162 to a supporting bracket 163, and has an elongated extension 164, forming at its end a detent surface 165. A stop pin or bar 166 engaging an offset part of the arm 164 limits the downward movement of the detent end thereof, the arm being held by gravity. The can trip arm 161 is pivoted at 168 to the support 163 and has an elongated detent arm extension 169, the downward movement of which, by force of gravity, being limited by the stop pin 166. The pawl 155 has projecting from the sides of a vertically extending arm thereof a suitable pin or lug 171, and the detent arms 164 and 169 are both normally in position to engage said pin 171 to thereby rock the pawl 155 and disengage the finger 157 from the rocking arm 159. Therefore, any movement of the can trip member 164 under the action of a can will not rock the latch trip shaft 136 so long as either or both of the detent arms 164 and 169 are in engagement with the pin 171.

In operation, assuming that no cans are on that portion of the runway adjacent the spacing mechanism, a first can, in rolling along the runway, presses the can trip member 147 downward, said member loosely rocking on the shaft, but simultaneously with said rocking movement the detent arms 160 and 161 disengage the members 157 and 158. Continued movement of the can releases the detent finger 164, but the same promptly resets itself in position.

The can next engages the finger 161 which releases the detent 169 and holds the same in releasing position, the can being at this time in the position indicated at $X^2$.

A second can will similarly operate and come to rest at the position indicated at $X^2$, at a time when it is in pressing contact with the pressing member 160, whereby to release and maintain the release of the second detent finger 169. At this time both detent fingers, being disengaged, a third can will roll into the position indicated at $X^3$, and on pressing the arm 147 downwardly, rocks the pawl, which latter, being at this time in contact with the lug of the intermediate dog 159, rocks the trip shaft 136 and connected parts, thereby releasing the latch 144 from the clutch dog 139 and permitting the latter to couple the shaft sections $119^a$ and $119^b$, whereby the spacing mechanism will operate.

As the trip arm 147 is released by a can, it, under the action of the spring 151 will rock on the trip shaft 136 in a reverse direction, coming to rest against the stop pin 149, and returning the latch 144 into position to engage the clutch dog 139, before the clutch cycle is completed, thus releasing said dog from the notched collar 137, thereby allowing the spacing disks to come to rest with cans in the positions indicated at X' and X². No further action of the spacing mechanism will take place until a third can passes into engagement with the trip finger 147, when the cycle of operation just described will be repeated. It is during this portion of the movement of the spacing disks in feeding the can from the position indicated at X' into the gripper fingers to be presently described, that the centering devices operate in the manner previously described.

Inasmuch as the clutch trip shaft 136 is free to rotate in its supporting brackets, a stop pin 173 is provided, which contacts with the supporting bracket 150, and prevents further inward movement of the dog 159, and a return spring 174 is provided to maintain the dog 159 in this position. A pin 176 in the rocker arm 154 limits the downward movement of the pawl 157 and a pin 177 in the rocker arm 154 acting against the finger on the intermediate dog 159 which, as previously stated is rigid with the shaft 136, insures the positive return of the latch 144 to the position illustrated in Fig. 3, when a can passes out of engagement with the end trip finger 147. The spring 174 merely serves to retain the rock shaft 136 in this position when the finger 147 is depressed by a single can in passing over the runway should there be no cans at the positions indicated at X' and X².

To prevent the clutch disk 133 from over running, the same is provided with a notch 133ª, adapted to be engaged by a spring held dog 133ᵇ, adapted to be automatically disengaged at the proper moment.

The folding mechanism for the projecting edges of the wrapper in the illustrated embodiment of the invention herein is constructed substantially as follows:—

This mechanism is mounted upon the supporting frame section B, the opposite sides of which have upon the top thereof journal boxes 178, forming bearings for a shaft 179, mounted for rotatable movement and adapted to be driven by a gear wheel 180, fixed on the same and in mesh with a pinion 181 fixed on the main driving shaft 125, heretofore referred to. The main drive shaft 125 may be driven in any suitable manner as by a driven belt (not shown) engaging a pulley 183 fixed on the shaft, or by other desirable means.

In that embodiment of the invention illustrated, this drive takes the form of an electric or other motor 184, mounted in any suitable manner on the framework B and having driving connection with the main drive shaft by means of suitable gearing, as a pinion 185, fixed on the motor shaft, adapted to mesh with a gear wheel 186, on a stub shaft 187, which has fixed thereto for movement therewith, a pinion 188, meshing with a gear wheel 189, positioned on the hub of a friction or other clutch, generally indicated by the numeral 190.

In this connection, it is found in practice that it is advantageous to employ a friction clutch drive in that the frictional engagement may be readily adjusted so as to give only sufficient driving grip and yet free enough to slip, thereby allowing the machine to stop in the event a dented can should become jammed in the mechanism.

Mounted on the main drive shaft 125 is a gear wheel 191, in mesh with a gear wheel 192, affixed to an elongated transversely extending shaft 193 projecting substantially from side to side of the machine and having adjacent the opposite end thereof a bevel gear 193ª, in mesh with a similar gear 194, keyed upon the shaft 24, which latter shaft extends longitudinally of the machine section A and is adapted to supply the power to the various parts of the wrapper applying section, as previously described.

The folding head supports or carriers proper, there being one at each side of the runway, as indicated at 195, are fixed upon the shaft 179, for rotatable movement therewith. The carriers 195 are conveniently ring-shaped as illustrated, and fixed thereto as by an integral hub portion are auxiliary ring shaped members 196. The ring-shaped members 195 and 196 are laterally separated from one another at the periphery whereby to receive therebetween suitable friction disks 197, having friction surfaces, one for each folding head proper, four being shown in the present embodiment, and separated from one another at intervals of arc substantially ninety degrees. The friction disks are loosely mounted on shafts 198 having bearings in the ring members 195—196, removable retaining caps 199 being provided, whereby to facilitate the assemblage or removal of these parts. The shafts 198 are tubular and keyed to the friction disks 197, but are free to move longitudinally. These tubular shafts constitute carriers for the folder heads proper 217.

A spider 201 is rigidly mounted on the rotatable shaft 179, the same having a plurality of radially extending arms, one for each head, and separated from one another by arcs of substantially ninety degrees. On each of said radial arms of the spider 201 are gripper fingers comprising two complementary members 202, and 203, the member 202 being fixed on the spider arms and the other, 203, being pivotally mounted to said member, as at 204. The movable member 203 is adapted to open and close during its rotatable movement with the shaft, and with this in view, a cam lever 203ª is operatively associated with the finger 203 and carries a roller 205, adapted to mesh in a cam way 206 on a cam disk 207. Said cam disk is stationary with respect to the cam roller 205, being loosely sleeved on the shaft 179, and adjustably mounted as by a bolt and slot connection 208 on the supporting bracket, 209, fixed to a stationary part of the machine.

The cam lever 203ª and movable finger 203 are pivoted on the same pin or shaft 204, and a projecting abutment 203ᵇ on the lever 203ª imparts outward movement to the finger 203, the contact between these parts being maintained by the spring 211. This spring also serves the function of providing a yielding connection between the cam lever and the gripper member 203, so that a compensating spring pressure is exerted upon slightly varying diameters of different cans. Likewise this yielding connection serves to compensate for any dents which may be present in the cans. The cam way 206 is of such construction that when the gripper fingers are passing by and between the spacing disks 125ª the gripper fingers 202 and 203 will be separated, and the finger 202 will pick up the cans from the pockets of the spacing disks. The continued movement of the gripper fingers brings the roll 205 into engagement with that portion of the cam permitting the fingers to close and hold the same stationary during the wrapper folding operation.

After the projecting edges of the wrapper are folded in the manner to be presently described, further movement of the cam roll 205 in the stationary cam way 206 causes the fingers to open, whereby to release the wrapped cans.

Loosely mounted upon the main driving shaft 179 are two cam members 212, and 213, respectively, of similar construction with the exception that the one member is made right hand, while the other is made left hand with regard to the folding mechanism arranged therebetween. The cam members 212—213 are rigid, being adjustably fixed in position in any desired manner and provided with radial lugs 178ª projecting downwardly from the bearings or journal boxes 178. The cam members 212 and 213 are adapted to impart longitudinal movement to the tubular shafts 198 upon which are mounted for movement therewith the wrapper and folding mechanisms. Supported on the tubular shafts are suitable cam rollers 215 adapted to engage the peripheral cam groove 212ª, in the cam members 212 and 213. The cam rollers 215 are mounted in brackets 216, sleeved upon the tubular shaft 198.

The folding mechanisms positioned on the shafts 198 are of like construction and a description of one will suffice for the others, it being understood in this connection that the projecting edges of the wrapper on opposite ends of the can are simultaneously folded over said ends or heads of the can. 217 is a folding head proper, the same being disk-shaped and having a hub 218 fixed as by pins 219 to the shaft 198. An actuating head 220 of disk-shape formation is fixed by a pin or pins 221 to an internal shaft 222 for longitudinal movement, the latter, with said shaft 222 passing through the tubular shaft 198 and the pin 221 being fitted into a slotted way 221ª in said tubular shaft whereby to permit independent longitudinal movement of the shaft after the head 217 has been moved inwardly.

The actuating means for the internal shaft includes a cam roller 223, said roller being mounted on a support 224 sleeved upon the shaft and yieldably held as by a spring 225 in contact with an edge of the cam surface 226 on the cam member 212.

Projecting inwardly from the head 217 are supporting brackets 227, and pivoted to the free ends thereof are hanger bars 228, to which latter are pivoted folding fingers 229, the latter being rotatable conical wrapper-engaging terminals at one end and shank extensions 230 at the opposite end, which latter are pivoted to the horizontally-disposed bars 231. The bars 231 are pivoted at the outer end to the periphery of the actuating head 220. Said bars 231 have thereon a cam projection 231ª, to engage the wall surrounding the slotted portion 232 of the head 217. Suitable springs 233 are interposed between the head 217 and the hanger arms 228, whereby to exert outward pressure on the folding fingers, to the end that the latter assume a position substantially parallel with the arms 227, in which position the conical shaped folding fingers engage over the outer surface of those portions of the wrapper which project beyond the ends of the can. Spring fingers 234 project from the head 217 and are adapted to engage the inner surface of the projecting edges of the wrapper during the folding of the latter in the manner now described.

The cam grooves 212ª are so constructed that the folding heads 217 are maintained in separated position and away from the ends of the can when the latter is picked up by the gripper fingers and positioned between the folding heads. The continued rotation of the shaft at 179, however, which imparts rotatable movement to the heads 195 and the folding mechanism mounted thereon brings the cam rollers 215 into contact with that portion of the cam grooves 212ª tending to force the folder heads 217 inward or toward the can heads. At this time the conical folding fingers 229 will overlie the outer surface of the projecting edges of the wrapper. Thereupon, also, the cam rollers 223 on the internal shaft come into engagement with the outwardly projecting portion of the cam surface 226, which will draw the shaft 222 and head 220 outwardly whereby the conical folding fingers are moved about their pivots, thereby folding the projecting edges of the wrapper against the ends of the can. In this folding action the springs 234, which may be termed creasing springs, engage the inner surface of the wrapper and being located intermediate the folder fingers or rolls to crease the wrapper as the fingers are thrown inwardly against the heads of the can, thus insuring a sharp and well defined crease in the wrapper at each fold.

At a time when the folding rollers are in spring-pressed contact with the folded wrapper edges, it is desirable to impart rotatable movement to the folding roller carrying heads whereby to smooth the folds and insure a snug engagement or contact of the folded edges of the wrapper against the ends or heads of the can. With this end in view, friction shoes 235 are provided, there being a shoe for each set of the friction disks 197. Said shoes are curved and of a length to at times simultaneously engage over two of said friction disks in the rotatable movement of the carrying head of the folding mechanism. A description of one of said shoes will answer for both, they being of like construction.

The shoes are preferably of metallic construction. They are pivotally supported as at 237 upon an equalizing arm 238, which latter is pivotally mounted upon a truss rod 239, the said equalizing arm acting under the action of an adjustably supported spring 240 to exert driving pressure against the friction disks 197. The relative position of the parts is such that for a short distance two of the disks 197 will be in engagement with the shoe 236, and by reason of the pivotal connection between the shoe and the equalizing arm the shoe will oscillate sufficiently to equalize the driving pressure between the two friction disks. Suitable set screws 241 may be employed for limiting the degree of oscillation. A suitable spring 242 may be utilized to prevent undue noise in the movement of the shoe. So soon as the friction disks are brought into engagement with the shoe, the tubular shafts 198 and the folding heads carried thereby are rotated and this rotation takes place substantially simultaneously with the engagement of the folding fingers with the heads of the can. The folder heads having rotated substantially one complete revolution, at which time the folded wrapper assumes a snug contact with the ends of the can, the rollers 225 engage a portion of the cam 212$^a$ whereby to force the folder heads outwardly or out of engagement with the folds of the wrapper, and, in this movement, the boss of the actuating disks 220 contact with the face portion 199 of the carrier head 195, thereby interrupting the movement of the disks 220 and causing the folding fingers to be moved outwardly or into position to engage the outer surface of the projecting edges of the wrapper of a succeeding can which has been labeled.

At this time the gripper fingers 202—203 are separated, whereby to discharge the completely wrapped can.

If desired, the intermittently rotating transversely disposed driving shaft sections 119$^a$, may have applied thereto means for preventing excess forward rotation, and to this end a suitable weight 243 may be provided, the same being suspended from a flexible cord or the like 244, which passes over and around the shaft 119$^a$ and is fixed at its opposite end to a stationary part of the frame work.

As previously described, the main drive shaft is adapted to be coupled and uncoupled with the driving mechanism through the medium of a clutch generally indicated by the numeral 183, and novel means for operating this clutch mechanism conveniently includes an elongated lever 246, pivoted at one end 247 to a transversely extending bracket 248, supported from the framework B. The lever 246 has connection intermediate its ends with the clutch member 183 and terminates at its end in a hand engaging member 249, arranged at a point adjacent the connection between the frames A and B. A transversely extending rod 250 is connected at 251 to the rod 246, and extends to a point adjacent the opposite side of the frame A, being connected at this point to a bell crank lever 251, pivoted at 252, to the frame A, the opposite arm of the bell crank lever 251 being connected to a horizontally extending bar 253, which projects longitudinally of the frame A and terminates at a point beyond that portion of the frame constituting the inlet end, and connecting with a handle 254. It will thus be appreciated that the clutch mechanism may be readily operated from either the hand engaging member 249, or the handle 254, and this is of importance, since assuming that an operator is stationed in position to watch the folding mechanism, and another operator is positioned so as to observe the labeling mechanism, the machine may be immediately stopped or started at either of these points as desired.

The operation of the various parts has been referred to when treating of these parts throughout the description, and it will only be necessary to review generally the operation of the machine at this time.

The cans being fed from the inlet chute to the spacing mechanism, at the inlet end thereof, will be separately taken up by the spacing disks and when in position thereon, the end pasting member having previously received a supply of paste from the paste pick up disks is moved laterally into contact with the can ends, so as to apply paste thereto. The can stop and guard coöperate with the spacing mechanism to the end that the cans will be accurately fed to the spacing mechanism. Being delivered from the spacing mechanism, the cans roll along the runway and contact with the top label on the label support, and wrap the label thereupon with the edges of the label projecting beyond the ends of the can. The cans with the applied labels are then properly centered upon the runway through the medium of the centering pins and roll into position adjacent the spacing mechanism immediately adjacent the folding mechanism. The spacing mechanism at this point is of a character to only operate after a plurality of cans are in proper position to be taken up by said spacing mechanism.

When the proper number of cans are accurately positioned they will be taken up one at a time by the respective pockets of the spacing mechanism and transferred from said pockets through the medium of the gripper mechanism into proper position relative to the folding mechanism.

It will be observed in this connection that a plurality of pairs of folding mechanism are provided and that these folding mechanisms successively act on the reciprocating cans, whereby to fold over the projecting edges of the labels and cause the same to assume a snug engagement with the ends of the cans. When folded the cans are released by the folding mechanism and the grippers and allowed to discharge onto a suitable delivery chute, carrier belt, or the like.

In the claims, wherein the term "can" or "cans" may be employed, as the article labeled, this designation is to be considered a general one as referring to various types of cartons, packages or the like, of a character to be labeled or wrapped in the manner specified.

We claim:—

1. In a machine of the character described, means for applying labels to the cans with edges of the labels projecting beyond the ends of the can, and a plurality of sets of folding mechanism operatively associated with said label applying means, and adapted to successively act on successively labeled cans to fold the edges of the wrapper over the ends of the cans, each of said sets of folding mechanism operating on independently labeled cans to completely fold said projecting edges of the labels.

2. In a machine of the character described, means for applying labels to the cans with edges of the labels projecting beyond the ends of the can, and a plurality of sets of folding mechanism operatively associated with said label applying means, said sets of folding mechanism comprising a cluster of movable folding fingers, the individual sets of folding mechanism being movable into position to register with successively labeled cans.

3. In a machine of the character described, the combination of label applying mechanism for applying labels to cans or the like with edges of the labels projecting beyond the ends of the can, a plurality of sets of folding mechanism to fold the projecting edges over the ends of the can, a common rotatable carrier for the plurality of sets of folding mechanism, and can spacing mechanism interposed between the labeling and folding mechanisms.

4. In a machine of the character described, the combination of label applying mechanism for applying labels to cans or the like with edges of the labels projecting beyond the ends of the can, folding mechanism to fold the projecting edges over the ends of the can, a rotatable carrier reel for the folding mechanism, can spacing mechanism interposed between the labeling and folding mechanisms, and means for transferring the can from the spacing mechanism to the folding mechanism.

5. In a machine of the character described, the combination of label applying mechanism for applying labels to cans or the like with edges of the labels projecting beyond the ends of the can, folding mechanism to fold the projecting edges over the ends of the can, can spacing mechanism interposed between the labeling and folding mechanisms, and can pick-up mechanism for transferring the cans from the spacing mechanism to the folding mechanism, said last mentioned means comprising opposed clamping jaws to engage the periphery of the cans.

6. In a machine of the character described, the combination of label supplying mechanism for applying labels to cans or the like with edges of the labels projecting beyond the ends of the can, folding mechanism to fold the projecting edges over the ends of the can, can spacing mechanism interposed between the labeling and folding mechanisms, and can gripper members adapted to engage and grip a can while in the spacing mechanism, said gripper means being movable to the folding mechanism and adapted to hold the can while the projecting edges of the label are folded.

7. In a machine of the character described, the combination of can labeling mechanism, can folding mechanism, to fold the edges of the label over the ends of the can, means for transferring the labeled can to the folding mechanism, said means including relatively movable arms adapted to engage the periphery of the labeled can.

8. In a machine of the character described, the combination of can labeling mechanism, can folding mechanism to fold the edges of the label over the ends of the can, means for transferring the labeled can to the folding mechanism, said means including relatively movable arms adapted to engage the periphery of the labeled can, and means for separating said arms whereby to discharge the wrapped cans, said arms when in closed position acting to hold the cans during the folding operation of the labels.

9. In a machine of the character described, the combination of can labeling mechanism, can folding mechanism adapted to fold the edges of the label over the ends of the can, means for transferring the labeled can to the folding mechanism, said means including relatively movable arms adapted to engage the periphery of the labeled can, said arms when in closed position adapted to hold the cans during the label folding operation, and cam operating means for the arms.

10. In a machine of the character described, labeling mechanism adapted to apply a label to the periphery of a can or the like, with edges projecting beyond the ends of the can, a rotatable carrier, a plurality of folding mechanisms mounted on said carrier and adapted in the rotation of the carrier to be moved successively into operative position relative to the labeled cans to fold the edges of the labels over the ends of the cans.

11. In a machine of the character described, labeling mechanism adapted to apply a label to the periphery of the can or the like, with edges projecting beyond the ends of the can, a rotatable carrier, a plurality of folding mechanisms mounted on said carrier and adapted in the rotation of the carrier to be moved successively into operative position relative to the labeled cans to fold the edges of the labels over the ends of the cans, and gripper mechanism to engage and hold the labeled can during the folding operation.

12. In a machine of the character described, labeling mechanism adapted to apply a label to the periphery of the can or the like, with edges projecting beyond the ends of the can, a rotatable carrier, a plurality of folding mechanisms mounted on said carrier and adapted in the rotation of the carrier to be moved successively into operative position relative to the labeled cans to fold the edges of the labels over the ends of the cans, and gripper mechanism to engage and hold the labeled can during the folding operation, there being a gripper mechanism for each folding mechanism, and cam means common to all of said gripper mechanisms for operating the same to engage and release the cans.

13. In a machine of the character described, labeling mechanism adapted to apply a label to the periphery of a can or the like, with edges projecting beyond the ends of the can, a rotatable carrier, a plurality of folding mechanisms mounted on said carrier and adapted in the rotation of the carrier to be moved successively into operative position relative to the labeled cans to fold the edges of the labels over the ends of the cans, and can spacing mechanism interposed between the labeling and folding mechanisms.

14. In a machine of the character described, labeling mechanism adapted to apply a label to the periphery of a can or the like, with edges projecting beyond the ends of the can, a rotatable carrier, a plurality of folding mechanisms mounted on said carrier and adapted in the rotation of the carrier to be moved successively into operative position relative to the labeled cans to fold the edges of the labels over the ends of the cans, and transfer mechanism operatively associated with the folding mechanisms.

15. In a machine of the character described, labeling mechanism adapted to apply a label to the periphery of a can or the like, with edges projecting beyond the ends of the can, a rotatable carrier, a plurality of folding mechanisms mounted on said carrier and adapted in the rotation of the carrier to be moved successively into operative position relative to the labeled cans to fold the edges of the labels over the ends of the cans, can spacing mechanism, means interposed between the spacing mechanism and labeling mechanism for centering the labeled can.

16. In a machine of the character described, labeling mechanism adapted to apply a label to the periphery of a can or the like, with edges projecting beyond the ends of the can, a rotatable carrier, a plurality of folding mechanisms mounted on said carrier and adapted in the rotation of the carrier to be moved successively into operative position relative to the labeled cans to fold the edges of the labels over the ends of the cans, can spacing mechanism, mechanism for centering the labeled can, and transfer means comprising can gripper members interposed between the spacing and folding mechanisms.

17. In a machine of the character described, labeling mechanism adapted to apply a label to the periphery of a can or the like, with edges projecting beyond the ends of the can, a rotatable carrier, a plurality of folding mechanisms mounted on said carrier and adapted in the rotation of the carrier to be moved successively into operative position relative to the labeled cans to fold the edges of the labels over the ends of the cans, can spacing mechanism interposed between the labeling and folding mechanism, driving mechanism for the folding mechanism, and operatively associated driving mechanism for the spacing mechanism.

18. In a machine of the character described, labeling mechanism adapted to apply a label to the periphery of a can or the like, with edges projecting beyond the ends of the can, a rotatable carrier, a plurality of folding mechanisms mounted on said carrier and adapted in the rotation of the carrier to be moved successively into operative position relative to the labeled cans to fold the edges of the labels over the ends of the cans, can spacing mechanism interposed between the labeling and folding mechanisms, driving mechanism for the folding mechanism, and operatively associated driving mechanism for the spacing mechanism, and a detachable coupling between said driving mechanism whereby one of said mechanisms may be interrupted in its movement.

19. In a machine of the character described, labeling mechanism adapted to apply a label to the periphery of a can or the like, with edges projecting beyond the ends of the can, a rotatable carrier, a plurality of folding mechanisms mounted on said carrier and adapted in the rotation of the carrier to be moved successively into operative position relative to the labeled cans to fold the edges of the labels over the ends of the cans, can spacing mechanism interposed between the labeling and folding mechanisms, driving mechanism for the folding mechanism, operatively associated driving mechanism for the spacing mechanism, a detachable coupling between said driving mechanisms, and automatic means for operating said coupling.

20. In a machine of the character described, labeling mechanism adapted to apply a label to the periphery of a can or the like, with edges projecting beyond the ends of the can, a rotatable carrier, a plurality of folding mechanisms mounted on said carrier and adapted in the rotation of the carrier to be moved successively into operative position relative to the labeled cans to fold the edges of the labels over the ends of the cans, can spacing mechanism interposed between the labeling and folding mechanism, driving mechanism for the folding mechanism, operatively associated driving mechanism for the spacing mechanism, a releasable coupling interposed between said driving mechanisms, and means controlled by the labeled cans for operating said coupling whereby to time the operation of the spacing mechanism.

21. In a machine of the character described, the combination of a plurality of sets of carrier heads, a movable support for said heads, folding mechanism for each set of heads, adapted to fold projecting edges of a label over the end of a can, said folding mechanism including a plurality of movable fingers adapted to engage and fold the projecting edges of the label, and friction means for imparting rotatable movement to the carrier heads for the folding fingers while said fingers are in contact with the folded edges of the labels.

22. In a machine of the character described, the combination of a plurality of sets of carrier heads, a movable support for said heads, folding mechanism for each set of heads, adapted to fold projecting edges of a label over the end of a can, said folding mechanism including a plurality of movable fingers adapted to engage and fold the projecting edges of the label, cam operating means for the fingers, and, friction driving means for imparting rotatable movement to the carrier heads while said fingers are in contact with the folded edges of the labels.

23. In a machine of the character described, the combination of pasting mechanism, means for applying labels to cans, with the edges of the label projecting beyond the ends of the can, folding mechanism for said projecting edges, a runway, and centering means independent of the pasting mechanism for the labeled can adapted to engage the ends of the can and center the same in advance of the folding operation.

24. In a machine of the character described, the combination of means for applying labels to cans, with the edges of the label projecting beyond the ends of the can, folding mechanism for said projecting edges, a runway, and elongated horizontally disposed centering rods of rigid construction to engage the ends of the can at the center thereof and spaced from the periphery thereof whereby to center the same in advance of the folding operation, said centering devices being relatively yieldably supported.

25. In a machine of the character described, the combination of means for applying a label to a can, with edges of the label projecting beyond the ends of the can, centering pins to engage the ends of the can, and ratchet mechanism for relatively moving said pins whereby to engage and release the cans.

26. In a machine of the character described, a runway for cans and the like having labels applied thereto, with edges of the labels projecting beyond the ends of the cans, folding mechanism, and an interposed can centering mechanism including a pin adapted to engage the end of the can, rack bars one for each pin, and a segment member having teeth to engage the respective rack bars for moving said pin.

27. In a machine of the character described, means for applying labels to cans with edges of the labels projecting beyond the ends of the cans, folding mechanism for said projecting edges of the labels, said mechanism including a rotatable support, and a plurality of sets of heads with folding fingers on said support, and spacing mechanism interposed between the labeling and folding mechanisms.

28. In a machine of the character described, the combination of means for applying labels to cans with edges of the labels projecting beyond the ends of the cans, folding mechanism for the projecting edges of the labels, spacing mechanism for the labeled cans, a can runway, and means governed by the movement of the cans along the runway for timing the operation of the spacing mechanism.

29. In a machine of the character described, the combination of means for applying labels to cans with edges of the labels projecting beyond the ends of the cans, folding mechanism for the projecting edges of the labels, spacing mechanism for the labeled cans, a can runway, a trip arm to be engaged by a can, in its movement along the runway, to set the spacing mechanism in operation, and can governing means for controlling the action of the first mentioned trip arm.

30. In a machine of the character described, the combination of means for applying labels to cans with edges of the labels projecting beyond the ends of the cans, folding mechanism for the projecting edges of the labels, spacing mechanism for the labeled cans, a can runway, and means for interrupting the movement of said spacing means until a plurality of cans are in position to be acted upon by the latter.

31. In a machine of the character described, the combination of means for applying labels to cans with edges of the labels projecting beyond the ends of the cans, folding mechanism for the projecting edges of the labels, spacing mechanism for the labeled cans, a can runway, said spacing means being rotatable and having can pockets, rotatable driving mechanism for the spacing means, and clutch mechanism governed by the movement of the cans for operating the clutch.

32. In a machine of the character described, the combination of means for applying labels to cans with edges of the labels projecting beyond the ends of the cans, folding mechanism for the projecting edges of the labels, spacing mechanism for the labeled cans, a can runway, said spacing means being rotatable and having can pockets, a drive member, a driven member, operatively associated with the spacing mechanism, and a releasable coupling between said members.

33. In a machine of the character described, the combination of means for applying labels to cans with edges of the labels projecting beyond the ends of the cans, folding mechanism for the projecting edges of the labels, spacing mechanism for the labeled cans, a can runway, said spacing means being rotatable and having can pockets, a drive member, a driven member, operatively associated with the spacing mechanism, a releasable coupling between said members, and means governed by the position of the cans on the runway for operating said coupling.

34. In a machine of the character described, the combination of means for applying labels to cans with edges of the labels projecting beyond the ends of the cans, folding mechanism for the projecting edges of the labels, spacing mechanism for the labeled cans, a can runway, said spacing means being rotatable and having can pockets, rotatable driving mechanism for the spacing means, clutch mechanism governed by the movement of the cans for operating the clutch, means for normally holding said coupling in position whereby to release operative driving connections, between the drive and driven members, and means controlled by a plurality of cans for reëstablishing connection between the drive and driven members.

35. In a machine of the character described, a can runway, folding mechanism, and spacing mechanism arranged in advance of the folding mechanism, a drive member, a driven member, a releasable coupling therebetween, a can trip arm operatively associated with said coupling, to normally disengage said members, and adapted under the action of a can to reëstablish connection, and a can trip arm normally preventing the last mentioned action of the first mentioned can trip arm.

36. In a machine of the character described, the combination of a can runway, label folding mechanism, a rotatable cylindrical spacing member, having a can pocket in the periphery thereof, and means for interrupting the movement of the spacing member until the cans assume a predetermined position on the runway.

37. In a machine of the character described, the combination of a can runway, label folding mechanism, a rotatable cylindrical spacing member, having a can pocket in the periphery thereof, a drive member, a driven member, a clutch disk on one member, a notched collar on the other, a spring held pivoted dog on said disk to engage the collar, and means governed by the position of a plurality of cans on the runway for actuating said dog against the action of the spring.

38. In a labeling machine, folding mechanism, a paste applying member, means for imparting rotatable movement to said member to register with the end of the can, and means for moving the same into contact with the end of the can.

39. In a machine of the character described, the combination of a runway, labeling mechanism, for applying labels to the cans, with edges of the same projecting beyond the ends of the can, folding mechanism for folding the edges of said projecting labels, and can end pasting means including a rotatable arm having paste applying members at the opposite ends thereof.

40. In a machine of the character described, the combination of a runway, labeling mechanism, for applying labels to the cans with edges of the same projecting beyond the ends of the can, folding mechanism for folding the edges of said projecting labels, and can end pasting means including a rotatable arm having paste applying members at the opposite ends thereof, a paste supply member, and means for simultaneously moving one of said paste applying members into contact with the end of the can and the other paste applying member into contact with said paste supply member.

41. In a machine of the character described, the combination of a runway for cans and the like, means for applying labels to the periphery of the can, with edges of the label projecting beyond the ends of the can, folding mechanism for said projecting edges, a rotatable cylindrical spacing member having a can pocket, and a guard overlying said spacing member.

42. In a machine of the character described, the combination of a runway for cans and the like, means for applying labels to the periphery of the can, with edges of the labels projecting beyond the ends of the can, folding mechanism for said projecting edges, a rotatable cylindrical spacing member having peripheral can pockets, a guard overlying said spacing member, and a can stop operatively associated with said guard.

43. In a can wrapping machine, the combination of mechanism for applying to the periphery of a can a label with edges of the label projecting beyond the ends of the can, a supporting frame for said means, an auxiliary supporting frame, folding mechanism mounted on the auxiliary frame adapted to fold the projecting edges of the label over the ends of the can, means for feeding the cans from the label applying to the folding mechanism, a detachable connection between the first mentioned frame and the auxiliary frame, and a detachable driving connection between the label applying and label folding mechanism, permitting separation of the frames and the paste carried thereby.

44. In a machine of the character described, the combination of means for applying a label over the end of a can, and means for previously applying paste to said end of the can, comprising a rotatable can support, a paste applying member, means for rotating said member to register the same with the can end in one of its positions.

45. In a machine of the character described, the combination of means for applying the label over the end of a can, and means for previously applying paste to said end of the can, comprising a rotatable can support, a paste applying member, paste supply means, means for rotating said paste applying member to register with the can end in one of its positions and with the paste supply means in another of its positions.

46. In a machine of the character described, the combination of means for applying the label over the end of a can, and means for previously applying paste to said end of the can, comprising a rotatable can support, a paste applying member, paste supply means, means for rotating said paste applying member to register with the can end in one of its positions and with the paste supply means in another of its positions, said paste applying member being mounted for sliding movement when properly registered.

47. In a machine of the character described, the combination of a can chute, a runway, label applying means in the path of the can along the runway, a can support interposed between the chute and runway, paste supply means, a movable arm, a paste applying member on the arm, and means for moving said arm to alternately register said paste applying member with the paste supply means and end of the can on said support.

48. In a machine of the character described, the combination of a can chute, a runway, label applying means in the path of the can along the runway, a can support interposed between the chute and runway, paste supply means, a rotatable arm, a paste applying member on the arm, and means for moving said arm to alternately register said paste applying member with the paste supply means and end of the can on said support.

49. In a machine of the character described, the combination of a can chute, a runway, label applying means in the path of the can along the runway, a can support interposed between the chute and runway, paste supply means, a movable arm, a paste applying member on the arm, means for moving said arm to alternately register said paste applying member with the paste supply means and end of the can on said support, and means for reciprocating said paste applying member into and out of contact with said can end and paste supply means.

50. In a machine of the character described, the combination of a can chute, a runway, label applying means in the path of the can along the runway, a can support interposed between the chute and runway, paste supply means, a rotatable arm, a paste applying member on the arm, means for moving said arm to alternately register said paste applying member with the paste supply means and end of the can on said support, and common means for rotating said can support and rotatable arm.

51. In a machine of the character described, the combination of a can chute, a runway, label applying means in the path of the can along the runway, a can support interposed between the chute and runway, paste supply means, a rotatable arm, a paste applying member at a free end of said arm, means for rotating the arm to alternately register said member with the paste supply means and an end of a can on said support.

52. In a machine of the character described, the combination of a can chute, a runway, label applying means in the path of the can along the runway, a can support interposed between the chute and runway, paste supply means, a rotatable arm, a paste applying member at a free end of said arm, means for rotating the arm to alternately register said member with the paste supply means and an end of a can on said support, and cam means for moving said paste applying member into contact with said parts when in registration therewith.

53. In a machine of the character described, the combination of a can chute, a runway, label applying means in the path of the can along the runway, a can support interposed between the chute and runway, paste supply means, a rotatable arm, a paste applying member at a free end of said arm, means for rotating the arm to alternately register said member with the paste supply means and an end of a can on said support, spring means for normally holding said paste applying member out of contact with said parts in the rotatable movement of said arm, and means acting in opposition to said spring to move the paste applying member in contact with said parts when in registration therewith.

54. In a machine of the character described, the combination of a can chute, a runway, label applying mechanism, a can support interposed between the chute and runway, a paste receptacle, a paste pick up disk in the receptacle, a rotatable arm, a paste applying member on the arm to alternately register with said disk and end of a can on the support.

55. In a machine of the character described, the combination of a can chute, a runway, label applying mechanism, a can support interposed between the chute and runway, a paste receptacle, a paste pick up disk in the receptacle, a rotatable arm, a paste applying member on the arm to alternately register with said disk and end of a can on the support, and means for moving said paste applying member into and out of contact with said parts when in registration.

56. In a machine of the character described, the combination of label applying mechanism, a runway for feeding cans to said mechanism, a can support in the path of the runway in advance of said mechanism, a paste receptacle, a rotatable paste pick-up member in the receptacle, a rotatable arm, paste applying members at opposite ends of the arm, means for reciprocating said members into and out of contact, one with the end of a can and the other with said rotatable paste supply member, and means for rotating the arm to alternately register the members with a can end and said disk.

57. In a machine of the character described, the combination of a can chute, a can runway, labeling mechanism in the path of cans along the runway, a can feed interposed between the chute and runway, comprising a rotatable reel having a peripheral can pocket, the wall of which is spaced at its base from the can periphery when the can is in position thereon.

58. In a machine of the character described, the combination of a can chute, a can runway, labeling mechanism in the path of cans along the runway, a can feed interposed between the chute and runway, comprising a rotatable reel having a plurality of peripheral can pockets, a shaft for the reel, a paste applying member supported from said shaft, paste supply means, and means whereby said paste applying member in the rotatable movement of said shaft alternately registers with the end of a can in a peripheral pocket of the reel and said paste supply means.

59. In a machine of the character described, the combination of a can chute, a can runway, labeling mechanism in the path of cans along the runway, a can feed interposed between the chute and runway, comprising a rotatable reel having a plurality of peripheral can pockets, a shaft for the reel, a paste applying member supported from said shaft, paste supply means, and means whereby said paste applying member in the rotatable movement of said shaft alternately registers with the end of a can in a peripheral pocket of the reel and said paste supply means, and means for moving the paste applying member in contact when in registration with said members.

60. In a machine of the character described, the combination of a can chute, a can runway, labeling mechanism in the path of cans along the runway, a can feed interposed between the chute and runway, comprising a rotatable reel having a plurality of peripheral can pockets adapted to receive cans from the chute and discharge the same onto the runway, and a curved guard overlying the reel and spaced therefrom to maintain the cans in position on the reel.

61. In a machine of the character described, the combination of a can chute, a can runway, labeling mechanism in the path of cans along the runway, a can feed interposed between the chute and runway, comprising a rotatable reel having a plurality of peripheral can pockets adapted to receive cans from the chute and discharge the same onto the runway, a curved guard overlying the reel and spaced therefrom to maintain the cans in position on the reel, and means whereby said guard member may move automatically under excess pressure of a can thereagainst.

62. In a machine of the character described, the combination of a can chute, a can runway, labeling mechanism in the path of cans along the runway, a can feed interposed between the chute and runway, comprising a rotatable reel having a plurality of peripheral can pockets adapted to receive cans from the chute and discharge the same onto the runway, a curved guard overlying the reel and spaced therefrom to maintain the cans in position on the reel, and a coöperating guide member for the cans overlying the runway and said reel.

63. In a machine of the character described, the combination of a can chute, a runway, can escapement mechanism arranged between the chute and runway, paste applying means, and label applying means including a label support, the side walls of which are laterally adjustable, and runway sections at the top of said sides of the label receptacle adapted in one position of the latter to form a continuation of the main runway for the cans.

64. In a machine of the character described, the combination of a runway for cans or the like, folding mechanism adjacent one end of the runway, and label applying mechanism adapted in the movement of the cans along the runway to apply a label thereto with edges of the label projecting beyond the ends of the can, and opposed guides for the ends of the can, said guides having upwardly offset parts at points adjacent said label applying means.

65. In a machine of the character described, the combination of folding mechanism, a can runway, paste applying means, and label applying means adapted to apply labels to the cans in the movement of the latter, said label applying means including a label receptacle intermediate the ends of the runway and forwardly of the folding mechanism, and opposed guides to engage the ends of the can, said guides having upwardly curved rear ends overlying the forward end of the label receptacle substantially as and for the purpose described.

66. In a machine of the character described, the combination of means for applying labels to cans with edges of the labels projecting beyond the ends of the can, folding mechanism, automatically operable centering pins to engage the ends of the cans at a point within the projecting edges of the label to center the cans previous to the folding operation, and movable supports to which said pins are rigidly connected.

67. In a machine of the character described, the combination of means for applying labels to cans with edges of the labels projecting beyond the ends of the can, folding mechanism, and automatically operable rigid centering pins to engage the ends of the cans at a point within the projecting edges of the label to center the cans previous to the folding operation, said means being yieldable to accommodate for different size cans.

68. In a machine of the character described, the combination of means for applying labels to cans with edges of the labels projecting beyond the ends of the can, folding mechanism, and automatically operable centering pins to engage the ends of the cans at a point within the projecting edges of the label to center the cans previous to the folding operation, and means for operating said pins including oppositely movable arms and a driving connection between said arms.

69. In a machine of the character described, the combination of means for applying labels to cans with edges of the labels projecting beyond the ends of the can, folding mechanism, and automatically operable centering pins to engage the ends of the cans at a point within the projecting edges of the label to center the cans previous to the folding operation, and means for operating said pins including oppositely movable arms, said arms taking the form of rack bars, and means simultaneously engaging said bars to reversely move the same.

70. In a machine of the character described, folding mechanism, paste applying and label applying mechanism, means for feeding the cans from the label applying to the folding mechanism including a runway, a rotatable reel having peripheral pockets adapted to pick up a can and deliver the same to the folding mechanism, and means for centering the cans before the same are taken up by said reel.

71. In a machine of the character described, the combination of folding mechanism, a rotatable reel having peripheral pockets, a can runway, means for applying labels to cans with edges of the label projecting beyond the ends of the can, said reel being adapted to pick up a labeled can from the runway to deliver the same to the folding mechanism, centering devices arranged forwardly of said reel, and the periphery of the reel acting as a can stop during the operation of said centering devices.

72. In a machine of the character described, the combination of labeling instrumentalities, a rotatable can feed or spacing device, a runway for delivering cans to said device, and means governed by the position of cans on the runway for actuating said device.

73. In a machine of the character described, the combination of labeling instrumentalities, a rotatable can feed or spacing device, a runway for delivering cans to said device, means for periodically rotating said device and can controlled means for actuating said last mentioned means.

74. In a machine of the character described, the combination of labeling instrumentalities, a rotatable can feed or spacing device, a runway for delivering cans to said device, means for rotating said device, and means governed by the position of a plurality of cans on said runway to actuate said means.

75. In a machine of the character described, the combination of labeling instrumentalities, a rotatable can feed or spacing device, a runway for delivering cans to said device, means for rotating said device and means governed by the position of cans on the runway for interrupting said movement.

76. In a machine of the character described, the combination of labeling instrumentalities, a rotatable can feed or spacing device, a runway for delivering cans to said device, means for rotating said device, and means governed by the position of cans on the runway for rendering both operative and inoperative the means for causing rotation of said device.

77. In a machine of the character described, the combination of labeling instrumentalities, a rotatable can feed or spacing device, a runway for delivering cans to said device, means governed by the movement of cans along the runway to rotate said device, locking means for said means, said locking means being releasable by another can on the runway.

78. In a machine of the character described, the combination of labeling instrumentalities, a rotatable can feed or spacing device, a runway for delivering cans to said device, means governed by the movement of a can along the runway to rotate said device, a plurality of locking means for the last mentioned means, said locking means being successively released by the movement of a plurality of cans on the runway.

79. In a machine of the character described, the combination of labeling instrumentalities, a rotatable can feed, a rotatable drive member, a driven member operatively connected with the can feed, and clutch mechanism interposed between the drive and driven members, said clutch mechanism being governed by the movement of cans along the runway.

80. In a machine of the character described, the combination of labeling instrumentalities, a rotatable can feed, a rotatable drive member, a driven member operatively connected with the can feed, and clutch mechanism interposed between the drive and driven members, and means for controlling said clutch including a plurality of operatively associated can trip members arranged in the path of the cans along the runway.

81. In a machine of the character described, the combination of label folding mechanism, a support for cans with labels thereon, and transfer means including movable gripper means comprising opposed relatively movable arms adapted to engage and grasp a labeled can at the periphery thereof, and receive the same from said support.

82. In a machine of the character described, the combination of label folding mechanism, a support for cans with labels thereon, and transfer means including movable gripper means comprising opposed relatively movable arms adapted to engage and grasp a labeled can at the periphery thereof, said gripping means being adapted to maintain the can stationary during the folding operation.

83. In a machine of the character described, the combination of label folding mechanism, means for supporting a can with an applied label with edges of the label projecting beyond the ends of the can, and transfer means including a gripper member movable with said folding mechanism, and comprising opposed jaws adapted to grasp and hold a can during the folding operation.

84. In a machine of the character described, the combination of folding mechanism, and can gripper mechanism adapted to grasp and hold a labeled can during the folding operation, said gripper mechanism comprising opposed jaws and automatically operable means to relatively move said jaws to grasp and release the cans, and a rotatable support for the gripper mechanism.

85. In a machine of the character described, the combination of folding mechanism, and means for picking up and operatively positioning cans relative to the folding mechanism comprising opposed jaws to engage the periphery of a can, and automatic means for relatively moving said jaws to clamp and release the cans.

86. In a machine of the character described, the combination of folding mecha- nism, and means for picking up and operatively positioning cans relative to the folding mechanism comprising opposed jaws to engage the periphery of a can, a rotatable support for the jaws, and means acting in the rotation thereof to relatively move the jaws to clamp and release the cans.

87. In a machine of the character described, the combination of folding mechanism, and means for picking up and operatively positioning cans relative to the folding mechanism comprising opposed jaws to engage the periphery of a can, a rotatable support for the jaws, means acting in the rotation thereof to relatively move the jaws to clamp and release the cans, and said jaws being yieldable under excess pressure.

88. In a machine of the character described, the combination of folding mechanism, and means for picking up and operatively positioning cans relative to the folding mechanism comprising opposed jaws to engage the periphery of a can, and cam controlled means relatively moving said jaws to clamp and release the cans.

89. In a machine of the character described, the combination of a plurality of sets of folding devices, a rotatable support therefor, and a plurality of sets of clamping devices one for each of said folding devices, said clamping devices being movable with the folding devices, and means acting in the movement of the folding devices to successively actuate the clamping means to engage and release the cans.

90. In a machine of the character described, the combination of a plurality of sets of folding devices, a rotatable support therefor, and a plurality of sets of clamping devices one for each of said folding devices, said clamping devices being movable with the folding devices, and cam controlled means acting in the movement of the folding devices to successively actuate the clamping means to engage and release the cans.

91. In a machine of the character described, the combination of a plurality of sets of folding mechanism, a common rotatable support therefor, and a plurality of gripping means one for each set of folding mechanism, said means being adapted to automatically engage and grip a can at its periphery during the folding operation.

92. In a machine of the character described, the combination of a plurality of sets of folding mechanism, a common rotatable support therefor, and a plurality of gripping means one for each set of folding mechanism, said means being adapted to automatically engage and grip a can at its periphery during the folding operation, said gripper means being mounted for rotatable movement with the folding mechanism, and means acting in the rotation thereof to release the gripping means after the folding operation.

93. In a machine of the character described, the combination of a rotatable can carrier having peripheral can pockets, folding means, and can gripper means comprising opposed relatively movable jaws adapted to pick up the can from the carrier and position the same relative to the folding mechanism.

94. In a machine of the character described, the combination of a rotatable can carrier having peripheral can pockets, folding means, and can gripper means comprising opposed relatively movable jaws adapted to pick up the can from the carrier and position the same relative to the folding mechanism, and means for automatically releasing said jaws from gripping action after completion of the folding operation.

95. In a machine of the character described, the combination of label applying mechanism and folding mechanism to fold projecting edges of the mechanism over the ends of the label applied article, said folding mechanism including a disk, a plurality of fingers pivotally mounted upon the disk, an auxiliary disk, a connection between the auxiliary disk and said fingers, and a plurality of cam means one for each of said disks whereby to move the same and actuate said folding fingers.

96. In a machine of the character described, the combination of a plurality of sets of folding heads, can holding means, a common rotatable support for the heads, and said heads being independently rotatable, and means in the path of the heads in the movement of the series of heads to successively rotate the heads independently.

97. In a machine of the character described, the combination of a plurality of sets of folding heads, can holding means, a common rotatable support for the heads, and said heads being independently rotatable, and friction means in the path of the heads in the movement of the series of heads to successively rotate the heads independently.

98. In a machine of the character described, the combination of means for applying to cans a label, with edges of the label projecting beyond the ends of the can, a plurality of independently rotatable heads having folding mechanism, a friction drive device, and means for moving the heads into operative engagement with the friction device whereby the heads are successively rotated.

99. In a machine of the character described, the combination of a plurality of sets of folding heads, a common support therefor, a segmental friction shoe, said heads being independently rotatable, and means for rotating said support whereby to successively bring the heads into operative engagement with the segmental shoe to independently rotate said heads.

100. In a machine of the character described, the combination of a plurality of sets of folding heads, a common support therefor, each set of heads being independently rotatable, a common drive means, and means for rotating said support whereby to successively bring each set of heads into operative association with said drive means, and means movable with the heads to support labeled cans during the folding operation.

101. In a machine of the character described, means for applying labels to cans with edges of the label projecting beyond the ends of the cans, a plurality of sets of folding mechanism, each set comprising opposed heads having folding fingers, means for supporting a can between each set of folding heads, and a movable support for the plurality of sets of folding mechanism.

102. In a machine of the character described, means for applying labels to cans with edges of the label projecting beyond the ends of the cans, a plurality of sets of folding mechanism, each set comprising opposed heads having folding fingers, means for feeding cans successively to successive sets of folding mechanism, and means for supporting the cans one between each of the opposed heads of the folding mechanism.

103. In a machine of the character described, the combination of means for applying labels to cans or the like with edges of the labels projecting beyond the ends of the cans, means to apply paste to the ends of the cans, folding mechanism to fold the projecting edges of the labels over the ends of the can, and means interposed between the pasting and folding means for centering the labeled can with regard to the folding mechanism.

104. In a machine of the character described, labeling mechanism adapted to apply a label to the periphery of cans, with edges of the label projecting beyond the ends of the can, a movable carrier, a plurality of folding mechanisms mounted on the carrier and adapted in the movement of the same to be moved successively into operative relation to the cans as labeled to fold the edges of the labels over the ends of the cans.

In testimony whereof we have hereunto set our hands this 11th day of February, 1915.

FREDERICK H. KNAPP.
HAYWOOD G. DEWEY.

Witnesses:
JAS. E. HUTCHINSON,
CALVIN T. MILANS.